US012743983B2

(12) United States Patent
Lee

(10) Patent No.: US 12,743,983 B2
(45) Date of Patent: Sep. 22, 2026

(54) DISPLAY DEVICE HAVING DIFFERENT SIZES OF DRIVING TRANSISTORS IN A PIXEL AND A DUMMY PIXEL

(71) Applicant: Samsung Display Co., Ltd., Yongin-Si (KR)

(72) Inventor: Kyung-Hun Lee, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/082,616

(22) Filed: Dec. 16, 2022

(65) Prior Publication Data

US 2023/0230522 A1 Jul. 20, 2023

(30) Foreign Application Priority Data

Jan. 19, 2022 (KR) ........................ 10-2022-0007681

(51) Int. Cl.
*G09G 3/20* (2006.01)
*G09G 3/32* (2016.01)

(52) U.S. Cl.
CPC ............ *G09G 3/2085* (2013.01); *G09G 3/32* (2013.01); *G09G 2300/0413* (2013.01); *G09G 2300/0842* (2013.01); *G09G 2310/0286* (2013.01); *G09G 2330/028* (2013.01)

(58) Field of Classification Search
CPC ......... G09G 3/2085; G09G 2300/0413; G09G 2300/0842; G09G 2310/0286; G09G 2330/028; G09G 2300/0819; G09G 3/20; G09G 2300/0426; G09G 2300/08; G09G 2300/0861; G09G 2320/0257; G09G 2320/045; G09G 3/007; G09G 3/3233; G09G 3/3266; G09G 2320/10; G09G 2320/106; G09G 3/32–3291; H10K 59/10–1315
See application file for complete search history.

(56) References Cited

U.S. PATENT DOCUMENTS

2011/0043551 A1* 2/2011 Kikuta ................ G09G 3/3233
345/691
2015/0077406 A1* 3/2015 Lee ........................ G09G 3/007
345/204

(Continued)

FOREIGN PATENT DOCUMENTS

CN 107274842 B 3/2021

*Primary Examiner* — Roberto W Flores
(74) *Attorney, Agent, or Firm* — Innovation Counsel LLP

(57) ABSTRACT

Provided is a display device comprising a display panel, an image shift controller, and a controller. The display panel is configured to display a display image, and includes a display area in which pixels are disposed and a sub-display area surrounding the display area and in which dummy pixels are disposed. The image shift controller is configured to generate a display image shift signal including information on a path through which the display image is shifted. The controller is configured to receive the display image shift signal to generate input image data to which the display image shift signal is applied. A size of a driving transistor included in each of the pixels disposed in the display area is different from a size of a driving transistor included in each of the dummy pixels disposed in the sub-display area.

8 Claims, 19 Drawing Sheets

(56) References Cited

U.S. PATENT DOCUMENTS

| | | | | |
|---|---|---|---|---|
| 2016/0189336 | A1* | 6/2016 | Lee | G09G 3/007 345/589 |
| 2018/0012530 | A1* | 1/2018 | Lee | G09G 3/2085 |
| 2018/0374426 | A1* | 12/2018 | Chen | G09G 3/3233 |
| 2022/0148522 | A1* | 5/2022 | Jang | G09G 3/3233 |
| 2022/0208797 | A1* | 6/2022 | Lai | H10D 86/471 |

* cited by examiner

DISPLAY DEVICE HAVING DIFFERENT SIZES OF DRIVING TRANSISTORS IN A PIXEL AND A DUMMY PIXEL

CROSS-REFERENCE TO RELATED APPLICATION

This application claims priority under 35 USC § 119 to Korean Patent Application No. 10-2022-0007681 filed on Jan. 19, 2022 in the Korean Intellectual Property Office (KIPO), the entire disclosure of which is incorporated herein by reference.

BACKGROUND

1. Field

The present disclosure generally relates to a display device. More particularly, the present disclosure relates to a display device capable of displaying a display image by a display image shift scheme.

2. Description of the Related Art

Flat panel display devices are used as display devices for replacing a cathode ray tube display device due to light-weight and thin characteristics thereof. As representative examples of such flat panel display devices, there are a liquid crystal display device, an organic light emitting display device, a quantum dot display device, and the like.

When a display device is driven for a long time, a pixel may deteriorate due to an increase in current stress, and an afterimage may occur in a portion where a fixed pattern or a logo of a display image is displayed. In order to solve such a problem, the display device may disperse the stress applied to the pixel by using a display image shift scheme (or a pixel shift scheme, an orbit driving scheme, etc.) of shifting an entire display image every preset time. For example, according to the display image shift scheme, the display image may be shifted in a predetermined direction, and black data may be displayed in an outer peripheral portion where the display image is not displayed due to the shift of the display image. In this case, according to the display image shift scheme, an origin of the display image (e.g., a center of the image) may be shifted in a clockwise or counterclockwise direction in the form of a rectangular helix.

SUMMARY

Embodiments provide a display device.

According to embodiments of the present disclosure, a display device includes a display panel, an image shift controller, and a controller. The display panel is configured to display a display image, and includes a display area in which pixels are disposed and a sub-display area surrounding the display area and in which dummy pixels are disposed. The image shift controller is configured to generate a display image shift signal including information on a path through which the display image is shifted. The controller is configured to receive the display image shift signal to generate input image data to which the display image shift signal is applied. A size of a driving transistor included in each of the pixels disposed in the display area is different from a size of a driving transistor included in each of the dummy pixels disposed in the sub-display area.

In embodiments, the driving transistor included in each of the pixels disposed in the display area may be defined as a first driving transistor, and the first driving transistor may include a first active pattern and a first gate electrode. The driving transistor included in each of the dummy pixels disposed in the sub-display area may be defined as a second driving transistor, and the second driving transistor may include a second active pattern and a second gate electrode. A size of the first driving transistor may be greater than a size of the second driving transistor.

In embodiments, the display area may include a first display area anda second display area surrounding the first display area. Each of sizes of the driving transistor included in each of the pixels disposed in the second display area and the driving transistor included in each of the dummy pixels disposed in the sub-display area may be gradually decreased in a direction from the first display area to the sub-display area.

In embodiments, each of the driving transistors included the pixels disposed in the first display area, respectively, may have a same size.

In embodiments, the display image may overlap the first display area and the second display area, or may overlap the first display area, at least a part of the second display area, and at least a part of the sub-display area.

In embodiments, the size of the driving transistor included in each of the dummy pixels may be gradually decreased in a direction from the display area to the sub-display area.

In embodiments, the pixels and the dummy pixels may be arranged in a matrix shape.

According to embodiments of the present disclosure, a display device includes a display panel, an image shift controller, and a controller. The display panel is configured to display a display image, and includes a display area in which pixels are disposed and a sub-display area surrounding the display area and in which dummy pixels are disposed. The image shift controller is configured to generate a display image shift signal including information on a path through which the display image is shifted. The controller is configured to receive the display image shift signal to generate input image data to which the display image shift signal is applied. The controller may be configured to determine a deterioration compensation area based on the display image shift signal and allow the pixels and the dummy pixels disposed in the deterioration compensation area to deteriorate.

In embodiments, the deterioration compensation area may not overlap any portion of a driving area in which the display image is displayed.

In embodiments, each of the pixels and the dummy pixels may include a first transistor, a second transistor, and a third transistor. The first transistor may include a first terminal to which a first power is applied, a second terminal connected to a first node, and a gate terminal connected to a second node. The second transistor may include a first terminal to which a data voltage is applied, a second terminal connected to the second node, and a gate terminal to which a data write gate signal is applied. The third transistor may include a first terminal connected to the first node, a second terminal to which an initialization power is applied, and a gate terminal to which a data initialization gate signal is applied.

In embodiments, each of the pixels and the dummy pixels may further include a light emitting element and a storage capacitor. The light emitting element may include a first terminal connected to the first node and a second terminal configured to receive a second power. The storage capacitor may be connected to the first node and the second node.

In embodiments, the pixels and the dummy pixels overlapping the deterioration compensation area may not emit lights while the display image is displayed.

In embodiments, the display device may further include a power supply unit including first power lines, second power lines, and initialization power lines. The first power lines may be disposed in a first area of the display panel. The second power lines may be disposed in a second area, wherein the first area is located between the adjacent second areas. The initialization power lines may be disposed in the first and second areas.

In embodiments, the power supply unit may be configured to continuously supply the first power to the pixels and the dummy pixels overlapping the first area, and selectively supply the first power to the pixels and the dummy pixels overlapping the second area.

In embodiments, the deterioration compensation area may include at least three selected from first, second, third and fourth deterioration compensation areas. The first and second deterioration compensation areas may correspond to remaining areas except a driving area in which the display image is displayed in the first area. The third and fourth deterioration compensation areas may correspond to remaining areas except the driving area in the second area.

In embodiments, while the display image is displayed by driving the pixels and the dummy pixels overlapping the driving area, the second and third transistors in the pixels and the dummy pixels overlapping the first and second deterioration compensation areas may be turned on, the data voltage may be supplied to the gate terminal of the first transistor to turn on the first transistor, and a current flows from the first power line to the initialization power line.

In embodiments, a voltage corresponding to an average of load voltages of the pixels or the dummy pixels overlapping the driving area that is adjacent to the first and second deterioration compensation areas may be supplied as the data voltage provided to the gate terminal of the first transistor of each of the pixels and the dummy pixels overlapping the first and second deterioration compensation areas.

In embodiments, while the display image is displayed by driving the pixels and the dummy pixels overlapping the driving area, the first power may not be applied to the second power line.

In embodiments, the second and third transistors in the pixels and the dummy pixels overlapping the third and fourth deterioration compensation areas are turned on, and the data voltage may be supplied to the gate terminal of the first transistor to turn on the first transistor. The initialization power may be provided to the first transistor.

In embodiments, a voltage corresponding to an average of load voltages of the pixels or the dummy pixels overlapping the driving area that is adjacent to the third and fourth deterioration compensation areas may be supplied as the data voltage provided to the gate terminal of the first transistor of each of the pixels and the dummy pixels overlapping the third and fourth deterioration compensation areas.

According to the display device of the embodiments of the present disclosure, the display panel may be configured such that a size of the first transistor of each of the pixels disposed in the second display area and the dummy pixels disposed in the sub-display area may be gradually decreased in the direction from the first display area to the peripheral area. For example, when the first transistor is manufactured with a relatively small size, stress caused by the driving current may be relatively increased, and a variation of a threshold voltage may be increased, so that the first transistor manufactured with the relatively small size may deteriorate relatively rapidly. In addition, the first transistor of each of the dummy pixels disposed in the sub-display area, which has a relatively slow deterioration rate, may be manufactured with a relatively smaller size. Accordingly, each of the pixels disposed in the second display area and the dummy pixels disposed in the sub-display area may deteriorate relatively rapidly as compared with deterioration of the pixels disposed in the first display area, and the dummy pixels disposed in the sub-display area may deteriorate relatively rapidly as compared with deterioration of the pixels disposed in the second display area, so that a spot may not be visually recognized on the display panel.

According to the display device of the embodiments of the present disclosure, the deterioration compensation area may be determined, and the pixels and/or the dummy pixels disposed in the deterioration compensation area may be configured such that the current may be provided to the first transistor along the current path or the initialization power may be supplied to the first transistor without emitting the light through the light emitting element, so that the pixels and/or the dummy pixels disposed in the deterioration compensation area may deteriorate. Accordingly, a spot may not be visually recognized on the display panel.

In addition, the voltage corresponding to the average of the load voltages of the pixels P and/or the dummy pixels disposed in the driving area that is adjacent to the deterioration compensation area may be supplied as the data voltage provided to the second transistor of each of the pixels and/or the dummy pixels disposed in the deterioration compensation area, so that the pixels and/or the dummy pixels disposed in the deterioration compensation area may deteriorate at a level that is similar to a deterioration level of the pixels and/or the dummy pixels disposed in the driving area that is adjacent to the deterioration compensation area. Accordingly, a spot may not be visually recognized on the display panel even more.

According to the embodiments of the present disclosure, the display device may include the pixel deterioration sensor configured to generate the pixel deterioration signal including the information on the average deterioration amount of the pixels and the dummy pixels disposed in the second display area and the sub-display area, so that the pixels and the dummy pixels disposed in the deterioration compensation area may be driven with the decreased luminances based on the average deterioration amount of the pixels and the dummy pixels disposed in the deterioration compensation area. Accordingly, a spot may not be visually recognized on the display panel.

BRIEF DESCRIPTION OF THE DRAWINGS

Embodiments can be understood in more detail from the following description taken in conjunction with the accompanying drawings.

DETAILED DESCRIPTION OF THE EMBODIMENTS

Figure 1:
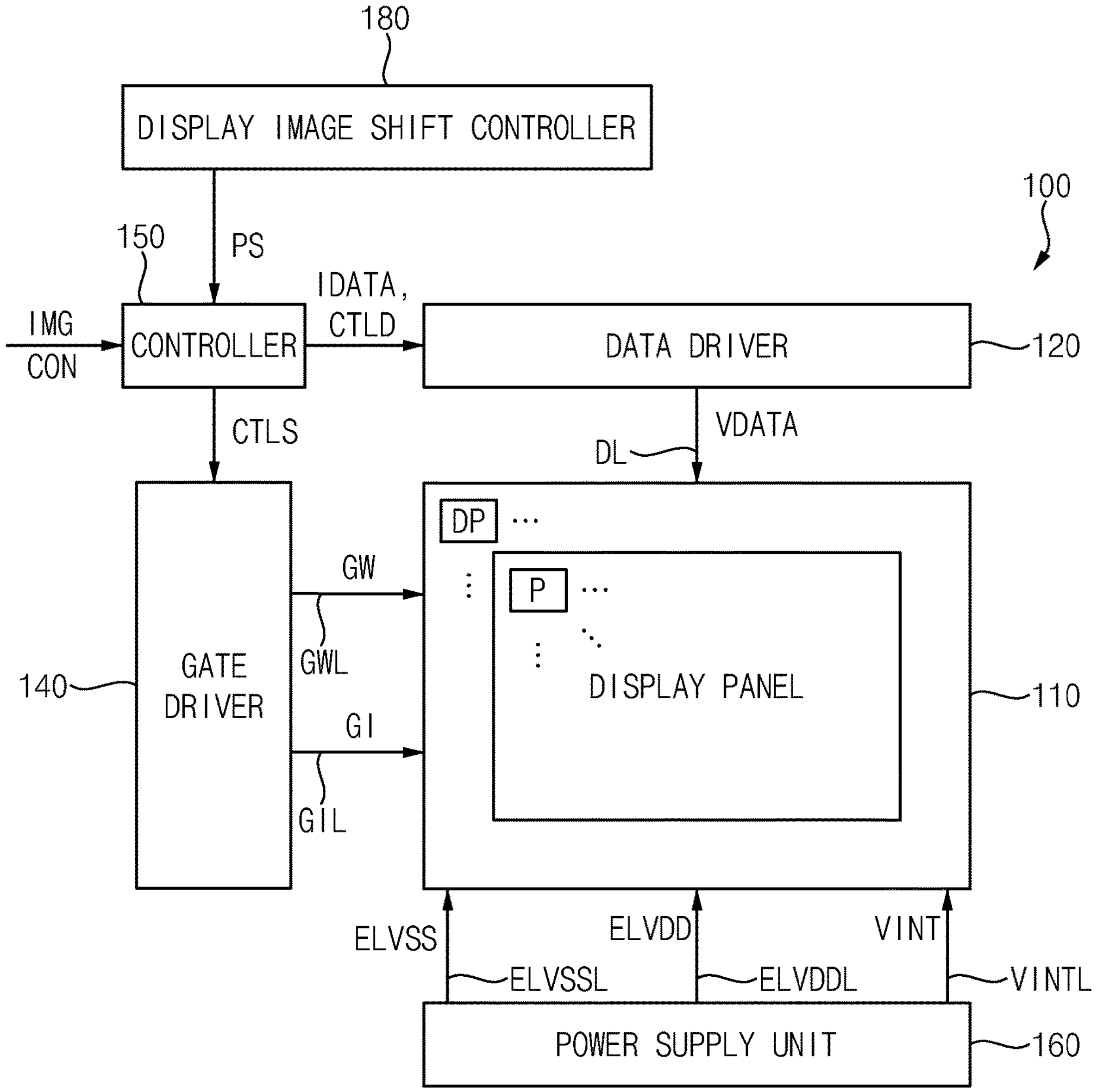
FIG. 1 is a block diagram showing a display device according to embodiments of the present disclosure.

Hereinafter, display devices according to embodiments of the present disclosure will be described in detail with reference to the accompanying drawings. In the accompanying drawings, same or similar reference numerals refer to the same or similar elements.

FIG. 1 is a block diagram showing a display device according to embodiments of the present disclosure.

Referring to FIG. 1, a display device 100 may include a display panel 110 including a plurality of pixels P and a plurality of dummy pixels DP, a controller 150, a data driver 120, a gate driver 140, a power supply unit 160, a display image shift controller 180, and the like.

The display panel 110 may include a plurality of data lines DL, a plurality of data write gate lines GWL, a plurality of data initialization gate lines GIL, a first power line ELVDDL, a second power line ELVSSL, an initialization power line VINTL, and a plurality of pixels P and a plurality of dummy pixels DP connected to the lines. In this case, the pixels P may be disposed at a center of the display panel 110, and the dummy pixels DP may be disposed at an outer periphery of the display panel 110 to surround the pixels P.

According to embodiments, each of the pixel P and the dummy pixel DP may include at least two transistors, at least one capacitor, and a light emitting element, and the display panel 110 may be a light emitting display panel. According to the embodiments, the display panel 110 may be a display panel of an organic light emitting display device (OLED). According to other embodiments, the display panel 110 may include a display panel of an inorganic light emitting display device (ILED), a display panel of a quantum dot display device (QDD), a display panel of a liquid crystal display device (LCD), a display panel of a field emission display device (FED), a display panel of a plasma display device (PDP), or a display panel of an electrophoretic display device (EPD).

The controller 150 (e.g., a timing controller (T-CON)) may receive image data IMG and an input control signal CON from an external host processor (e.g., an application processor (AP), a graphic processing unit (GPU), or a graphic card). The image data IMG may be RGB image data (or RGB pixel data) including red image data (or red pixel data), green image data (or green pixel data), and blue image data (or blue pixel data). In addition, the image data IMG may include information on a driving frequency. The control signal CON may include a vertical synchronization signal, a horizontal synchronization signal, an input data enable signal, a master clock signal, and the like, but the embodiments are not limited thereto.

The controller 150 may convert (or generate) the image data IMG into input image data IDATA by applying an algorithm (e.g., dynamic capacitance compensation (DCC), etc.) for correcting image quality to the image data IMG supplied from the external host processor. In some embodiments, when the controller 150 does not include an algorithm for improving image quality, the image data IMG may be output as the input image data IDATA. The controller 150 may supply the input image data IDATA to the data driver 120.

The controller 150 may generate a data control signal CTLD for controlling an operation of the data driver 120 and a gate control signal CTLS for controlling an operation of the gate driver 140 based on the input control signal CON. For example, the gate control signal CTLS may include a vertical start signal, gate clock signals, and the like, and the data control signal CTLD may include a horizontal start signal, a data clock signal, and the like.

According to the embodiments, when a display image is output from (or displayed on) the display panel 110 for a preset time, the controller 150 may receive a display image shift signal PS from the display image shift controller 180. When the controller 150 receives the display image shift signal PS, the controller 150 may supply the input image data IDATA to which the display image shift signal PS is applied to the data driver 120 so that the display image is entirely shifted.

The gate driver 140 may generate data write gate signals GW and data initialization gate signals GI based on the gate control signal CTLS received from the controller 150. The gate driver 140 may output the data write gate signals GW and the data initialization gate signals GI to the pixels P and the dummy pixels DP, which are connected to the data write gate lines GWL and the data initialization gate lines GIL, respectively.

The power supply unit 160 may generate a first power ELVDD, a second power ELVSS, and an initialization power VINT, and may provide the first power ELVDD, the second power ELVSS, and the initialization power VINT to the pixels P and the dummy pixels DP through the first power line ELVDDL, the second power line ELVSSL, and the initialization power line VINTL. According to the embodiments, a voltage level of the first power ELVDD may be higher than a voltage level of the second power ELVSS.

The data driver 120 may receive the data control signal CTLD and the input image data IDATA (or the input image data IDATA to which the display image shift signal PS is applied) from the controller 150. In addition, the data driver 120 may receive a gamma reference voltage from a gamma reference voltage generator. The data driver 120 may convert digital input image data IDATA into an analog data voltage by using the gamma reference voltage. In this case, the analog data voltage obtained by the conversion will be defined as a data voltage VDATA. The data driver 120 may output data voltages VDATA to the pixels P and the dummy pixels DP, which are connected to the data lines DL, based on the data control signal CTLD. For example, the data driver 120 may include a shift register, a data sampling latch, a data holding latch, a level shifter, a digital-to-analog converter, a buffer, and the like. According to the embodiments, the display panel 110 may initially output the display image only through the pixels P without outputting the display image through the dummy pixels DP. In this case, the data driver 120 may receive the input image data IDATA from the controller 150. Meanwhile, when the display image is output from (or displayed on) the display panel 110 for the preset time, the data driver 120 may receive the input image data IDATA to which the display image shift signal PS is applied from the controller 150. In this case, the display image may be entirely shifted in the display panel 110, and the display image may be output through some of the dummy pixels DP.

In some embodiments, the data driver 120 and the controller 150 may be implemented as a single integrated circuit, and such an integrated circuit may be referred to as a timing controller-embedded data driver (TED).

The display image shift controller 180 may generate the display image shift signal PS, and supply the display image shift signal PS to the controller 150. The display image shift signal PS may include information on a path through which the display image is shifted. In some embodiments, the display image shift controller 180 and the controller 150 may be implemented as a single integrated circuit.

Figure 2:
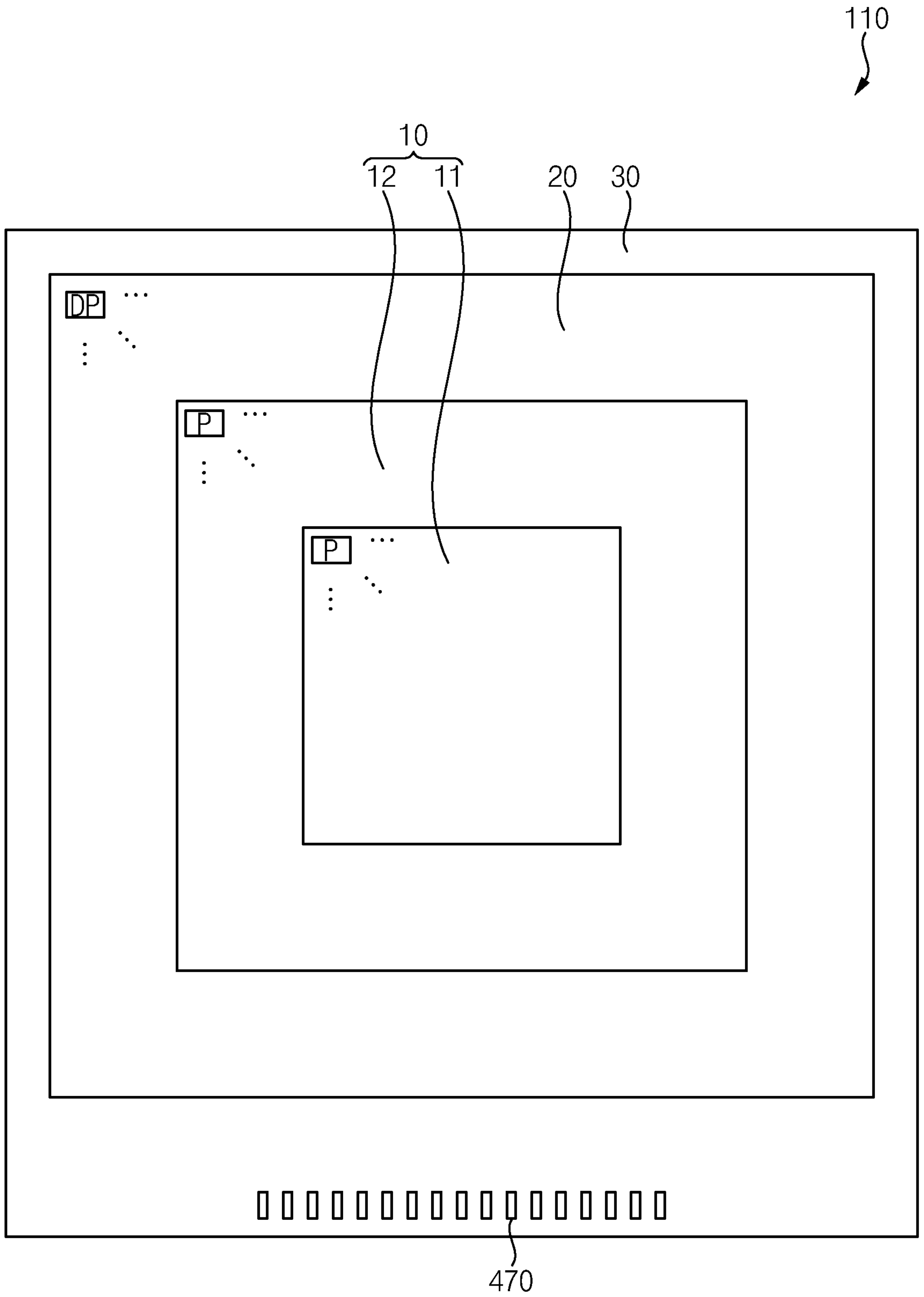
FIG. 2 is a plan view for describing a display panel included in the display device of FIG. 1.

FIG. 2 is a plan view for describing a display panel included in the display device of FIG. 1.

Referring to FIG. 2, the display panel 110 may include a display area 10, a sub-display area 20 surrounding the display area 10, and a peripheral area 30 surrounding the sub-display area 20. In this case, the display area 10 may include a first display area 11 and a second display area 12 surrounding the first display area 11.

The pixels P may be disposed in the display area 10. In other words, the pixels P may be disposed in the first display area 11 and the second display area 12 respectively. The dummy pixels DP may be disposed in the sub-display area 20. A plurality of pad electrodes 470 electrically connected to an external device may be disposed in the sub-display area 20. In some embodiments, the controller 150, the power supply unit 160, the data driver 120, and/or the gate driver 140 may be disposed in the peripheral area 30.

Figure 3:
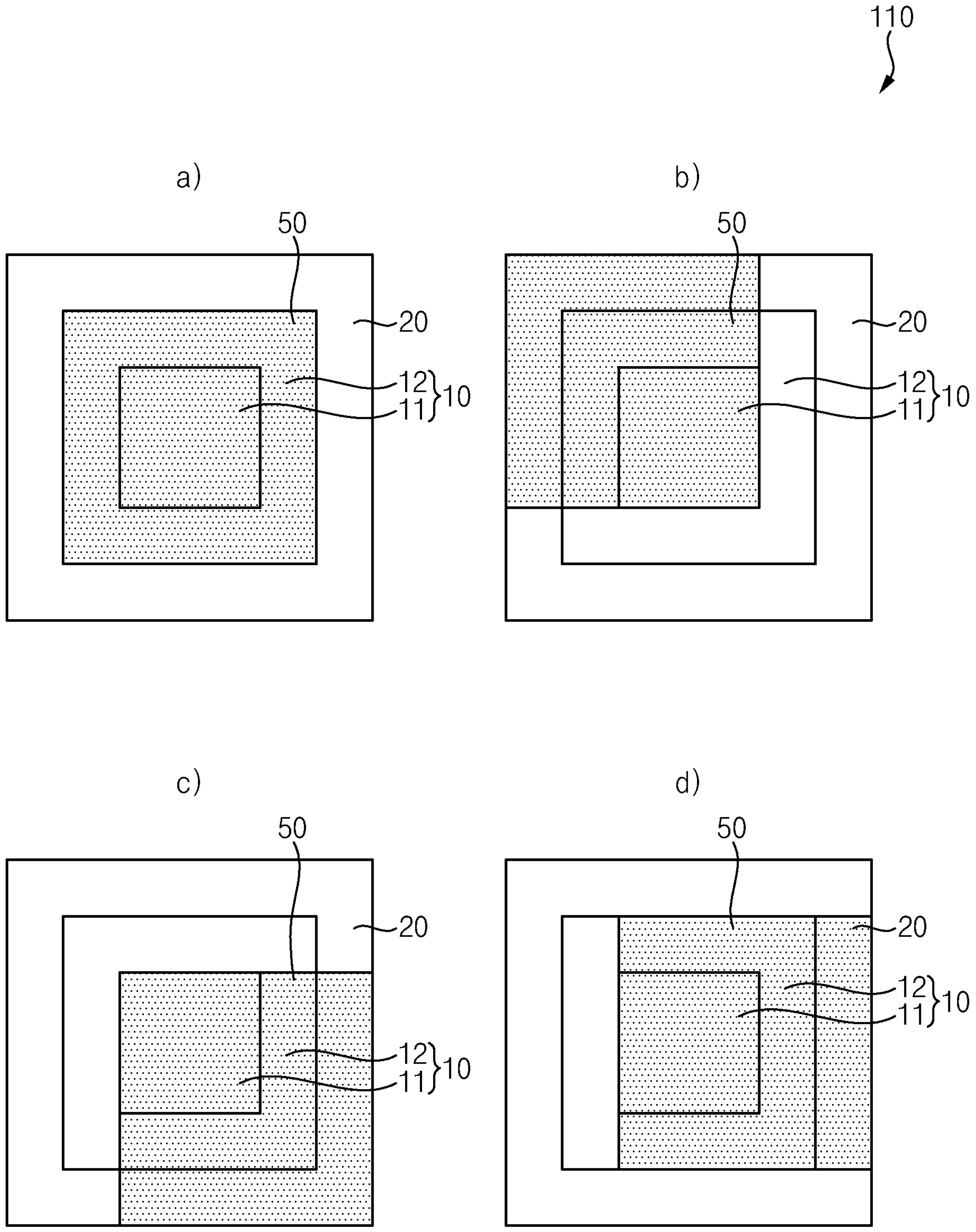
FIG. 3 is a plan view for describing various shapes in which a display image is shifted in the display panel of FIG. 2.

FIG. 3 is a plan view for describing various shapes in which a display image is shifted in the display panel of FIG. 2.

Referring to the first shape (a) in FIG. 3, the display panel 110 may initially display a display image 50 only in the display area 10.

Referring to the second, third, and fourth shapes (b, c, and d) in FIG. 3, when the display image 50 is output from the display panel 110 for a preset time, the data driver 120 may receive the input image data IDATA to which the display image shift signal PS is applied from the controller 150 so that the display image 50 may be entirely shifted, and the display image 50 may be output from some of the dummy pixels DP. In other words, the controller 150 may provide the input image data IDATA to which the display image shift signal PS is applied to the data driver 120 in order to output the shifted display image 50, and the data driver 120 may provide data voltages VDATA corresponding to the shifted display image 50 to the display panel 110 based on the input image data IDATA to which the display image shift signal PS is applied.

According to the embodiments, even when the display image 50 is shifted, the display image 50 may always be displayed in the first display area 11. In other words, the pixels P disposed in the first display area 11 may always emit lights while the display image 50 is displayed. Meanwhile, when the display image 50 is shifted, the pixels P disposed in the second display area 12 and the dummy pixels DP disposed in the sub-display area 20 may selectively emit lights.

For example, the second shape (b) in FIG. 3 shows a shape in which the display image 50 is shifted to an upper left end. In this case, the pixels P disposed in the first display area 11 may emit lights, and the pixels P disposed in the second display area 12 and the dummy pixels DP disposed in the sub-display area 20 may selectively emit lights.

In addition, the third shape in FIG. 3 shows a shape in which the display image 50 is shifted to a lower right end. In this case, the pixels P disposed in the first display area 11 may emit lights, and the pixels P disposed in the second display area 12 and the dummy pixels DP disposed in the sub-display area 20 may selectively emit lights.

Furthermore, the fourth shape in FIG. 3 shows a shape in which the display image 50 is shifted to a right side. In this case, the pixels P disposed in the first display area 11 may emit lights, and the pixels P disposed in the second display area 12 and the dummy pixels DP disposed in the sub-display area 20 may selectively emit lights.

As shown in FIG. 3, the display image 50 may overlap the first display area 11 and the second display area 12, or may overlap the first display area 11, at least a part of the second display area 12, and at least a part of the sub-display area 20.

However, although the display images 50 shifted in three directions have been shown in the second, third, and fourth shapes in FIG. 3, a shape in which the display image 50 is shifted is not limited thereto. For example, the display image 50 may be gradually shifted in various directions.

Figure 4:
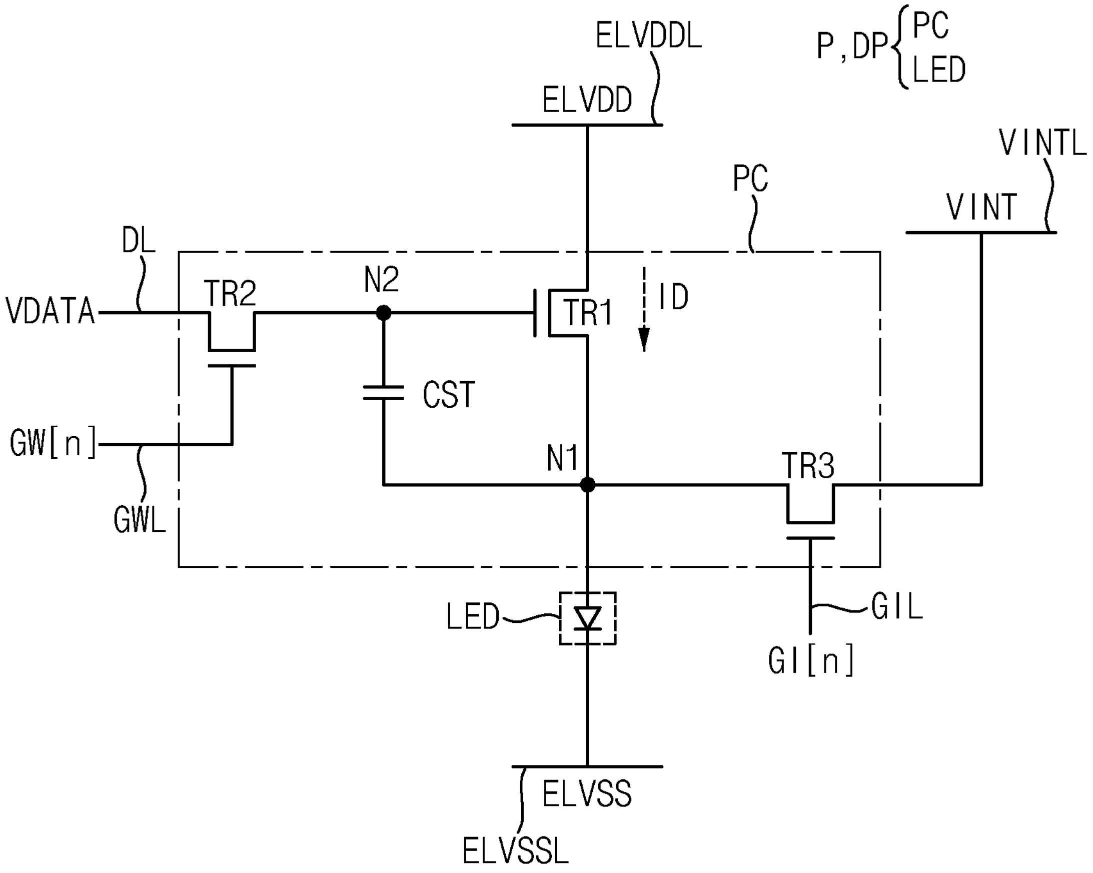
FIG. 4 is a circuit diagram for describing a pixel and a dummy pixel included in the display panel of FIG. 2.

FIG. 4 is a circuit diagram for describing a pixel and a dummy pixel included in the display panel of FIG. 2.

The display device 100 may include a pixel P and a dummy pixel DP, and each of the pixel P and the dummy pixel DP may include a pixel circuit PC and a light emitting element LED. In this case, the pixel circuit PC may include first to third transistors TR1, TR2, and TR3, a storage capacitor CST, and the like. In addition, the pixel circuit PC or the light emitting element LED may be connected to the first power line ELVDDL, the second power line ELVSSL, the initialization power line VINTL, the data line DL, the data write gate line GWL, the data initialization gate line GIL, and the like. The first transistor TR1 may correspond to a driving transistor, and the second and third transistors TR2 and TR3 may correspond to switching transistors. Each of the first to third transistors TR1, TR2, and TR3 may include a first terminal, a second terminal, and a gate terminal. According to the embodiments, the first terminal may be a source terminal, and the second terminal may be a drain terminal. In some embodiments, the first terminal may be a drain terminal, and the second terminal may be a source terminal.

According to the embodiments, each of the first to third transistors TR1, TR2, and TR3 may be an NMOS transistor, and may have a channel including a metal oxide semiconductor. According to other embodiments, each of the first to third transistors TR1, TR2, and TR3 may be a PMOS transistor, and may have a channel including polysilicon.

The light emitting element LED may output a light based on a driving current ID. The light emitting element LED may include a first terminal and a second terminal. According to the embodiments, the first terminal of the light emitting element LED may be connected to a first node N1 to receive the first power ELVDD, and the second terminal of the light emitting element LED may receive the second power ELVSS. In this case, the first power ELVDD and the second power ELVSS may be provided from the power supply unit 160 through the first power line ELVDDL and the second power line ELVSSL, respectively. For example, the first terminal of the light emitting element LED may be an anode terminal, and the second terminal of the light emitting element LED may be a cathode terminal. In some embodiments, the first terminal of the light emitting element LED may be a cathode terminal, and the second terminal of the light emitting element LED may be an anode terminal.

The first power ELVDD may be applied to the first terminal of the first transistor TR1. The second terminal of the first transistor TR1 may be connected to the first node N1. The gate terminal of the first transistor TR1 may be connected to a second node N2. The first transistor TR1 may generate the driving current ID.

The gate terminal of the second transistor TR2 may receive a data write gate signal GW[n]. In this case, the data write gate signal GW[n] may be provided from the gate driver 140 through the data write gate line GWL. The first terminal of the second transistor TR2 may receive the data voltage VDATA. In this case, the data voltage VDATA may be provided from the data driver 120 through the data line DL. The second terminal of the second transistor TR2 may be connected to the second node N2. In other words, the second transistor TR2 and the first transistor TR1 may be connected to each other by the second node N2, and the data voltage VDATA may be supplied to the gate terminal of the first transistor TR1 during an activation period of the data write gate signal GW[n].

The gate terminal of the third transistor TR3 may receive a data initialization gate signal GI[n]. In this case, the data initialization gate signal GI[n] may be provided from the gate driver 140 through the data initialization gate line GIL. The second terminal of the third transistor TR3 may receive the initialization power VINT. The first terminal of the third transistor TR3 may be connected to the first node N1. In other words, the third transistor TR3 and the first transistor TR1 may be connected to each other by the first node N1, and the initialization power VINT may be supplied to the second terminal of the first transistor TR1 during an activation period of the data initialization gate signal GI[n]. According to other embodiments, light emitting characteristics (e.g., a threshold voltage of the first transistor TR1, mobility, and deterioration information of the light emitting element LED) of the pixel P or the dummy pixel DP may be sensed through the data initialization gate line GIL in a period during which the light emitting element LED does not output the light.

The storage capacitor CST may be connected between the second node N2 and the first node N1. The storage capacitor CST may include a first terminal and a second terminal. For example, the first terminal of the storage capacitor CST may receive the data voltage VDATA, and the second terminal of the storage capacitor CST may be connected to the second terminal of the first transistor TR1. The storage capacitor CST may maintain a voltage level of the gate terminal of the first transistor TR1 during an inactivation period of the data write gate signal GW[n]. Therefore, the driving current ID generated by the first transistor TR1 may be supplied to the light emitting element LED based on the voltage level maintained by the storage capacitor CST.

However, although the pixel circuit PC according to the present disclosure has been described as including one driving transistor, two switching transistors, and one storage capacitor, the configuration of the present disclosure is not limited thereto. For example, the pixel circuit PC may have a configuration including at least one driving transistor, at least one switching transistor, and at least one storage capacitor.

Figure 5:
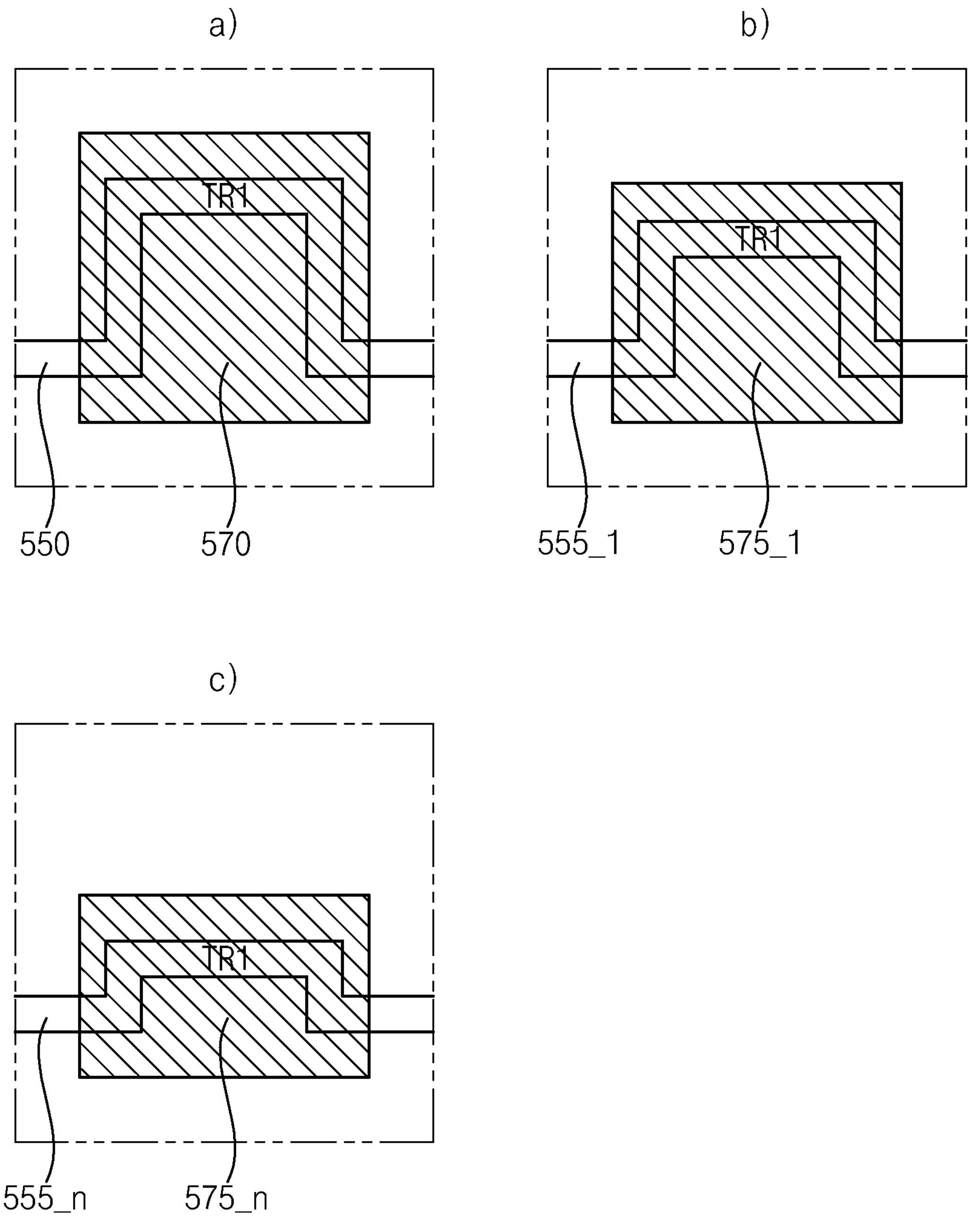
FIG. 5 is a layout view showing various shapes of first transistors included in the pixel and the dummy pixel of FIG. 4.

FIG. 5 is a layout view showing various shapes of first transistors included in the pixel and the dummy pixel of FIG. 4.

Referring to FIGS. 2 and 5, the pixels P may be disposed in the display area 10, and the dummy pixels DP may be disposed in the sub-display area 20. For example, the pixels P in the display area 10 and the dummy pixels DP in the sub-display area 20 may be arranged in a matrix shape. In other words, the pixels P and the dummy pixels DP may be defined with pixel rows and pixel columns, and the pixel rows and the pixel columns may be spaced apart from each other at substantially the same interval.

According to the embodiments, the first transistor TR1 of each of the pixels P disposed in the first display area 11 may have a first shape (a) as shown in FIG. 5. The first transistor TR1 of the pixel P disposed in the first display area 11 may be defined with an active pattern 550 and a gate electrode 570, and a portion where the active pattern 550 and the gate electrode 570 overlap each other may correspond to a channel of the first transistor TR1 of the pixel P disposed in the first display area 11. In addition, the first transistors TR1 of the pixels P disposed in the first display area 11 may have the same size.

According to the embodiments, a size of the first transistor TR1 of each of the pixels P disposed in the second display area 12 and a size of the first transistor TR1 of each of the dummy pixels DP disposed in the sub-display area 20 may be different from a size of the first transistor TR1 of each of the pixels P disposed in the first display area 11.

For example, the first transistor TR1 of each of the pixels P located closest to the first display area 11 among the pixels P disposed in the second display area 12 may have a second shape (b) as shown in FIG. 5. In this case, the pixels P located closest to the first display area 11 among the pixels P disposed in the second display area 12 may surround the first display area 11. The first transistor TR1 of each of the pixels P located closest to the first display area 11 among the pixels P disposed in the second display area 12 may be defined with a first active pattern 555_1 and a first gate electrode 575_1, and a portion where the first active pattern 555_1 and the first gate electrode 575_1 overlap each other may correspond to a channel of the first transistor TR1 of each of the pixels P located closest to the first display area 11 among the pixels P disposed in the second display area 12. In addition, a size of the first transistor TR1 of each of the pixels P disposed in the second display area 12 may be gradually decreased in a direction from the first display area 11 to the peripheral area 30 (e.g., in a direction from the center of the display panel 110 to the outer periphery of the display panel 110). Furthermore, a size of the first transistor TR1 of each of the pixels P located closest to the first display area 11 among the pixels P disposed in the second display area 12 may be less than the size of the first transistor TR1 of each of the pixels P disposed in the first display area 11.

In addition, the first transistor TR1 of each of the dummy pixels DP located at an outermost periphery of the sub-display area 20 among the dummy pixels DP disposed in the sub-display area 20 may have a third shape (c) as shown in FIG. 5. In this case, the dummy pixels DP located at the outermost periphery of the sub-display area 20 among the dummy pixels DP disposed in the sub-display area 20 may be adjacent to the peripheral area 30. The first transistor TR1 of each of the dummy pixels DP located at the outermost periphery of the sub-display area 20 among the dummy pixels DP disposed in the sub-display area 20 may be defined with an $n^{th}$ active pattern 555_*n* and an $n^{th}$ gate electrode 575_*n*, and a portion where the $n^{th}$ active pattern 555_*n* and the $n^{th}$ gate electrode 575_*n* overlap each other may correspond to a channel of the first transistor TR1 of each of the dummy pixels DP located at the outermost periphery of the sub-display area 20 among the dummy pixels DP disposed in the sub-display area 20. In addition, a size of the first transistor TR1 of each of the dummy pixels DP disposed in the sub-display area 20 may be gradually decreased in the direction from the first display area 11 to the peripheral area 30. In other words, a size of the first transistor TR1 of each of the dummy pixels DP located at the outermost periphery of the sub-display area 20 among the dummy pixels DP disposed in the sub-display area 20 may be less than a size of the first transistor TR1 of each of the dummy pixels DP located closest to the second display area 12 among the dummy pixels DP disposed in the sub-display area 20. Furthermore, the size of the first transistor TR1 of each of the dummy pixels DP located closest to the second display area 12 among the dummy pixels DP disposed in the sub-display area 20 may be less than a size of the first transistor TR1 of each of the pixels P located closest to the sub-display area 20 among the pixels P disposed in the second display area 12.

As shown in FIG. 3, even when the display image 50 is entirely shifted, the display image 50 may always be displayed in the first display area 11. In other words, the pixels P disposed in the first display area 11 may always emit lights while the display image 50 is displayed. That is, the pixels P disposed in the first display area 11 may deteriorate relatively rapidly.

According to a conventional display device, due to a deterioration deviation of pixels disposed in a first display area with respect to pixels disposed in a second display area and dummy pixels disposed in a sub-display area, a spot may be visually recognized in the second display area and the sub-display area. For example, the pixels disposed in the second display area and the dummy pixels disposed in the sub-display area may deteriorate relatively less, so that the second display area and the sub-display area may be visually recognized to be brighter than the first display area.

According to the display device 100 of the embodiments of the present disclosure, the display panel 110 may be configured such that a size of the first transistor TR1 of each of the pixels P disposed in the second display area 12 and the dummy pixels DP disposed in the sub-display area 20 may be gradually decreased in the direction from the first display area 11 to the peripheral area 30. For example, when the first transistor TR1 is manufactured with a relatively small size, stress caused by the driving current may be relatively increased, and a variation of a threshold voltage may be increased so that the first transistor TR1 manufactured with the relatively small size may deteriorate relatively rapidly. In addition, the first transistor TR1 of each of the dummy pixels DP disposed in the sub-display area 20, which has a relatively slow deterioration rate, may be manufactured with a relatively smaller size. Accordingly, each of the pixels P disposed in the second display area 12 and the dummy pixels DP disposed in the sub-display area 20 may deteriorate relatively rapidly as compared with deterioration of the pixels P disposed in the first display area 11, and the dummy pixels DP disposed in the sub-display area 20 may deteriorate relatively rapidly as compared with deterioration of the pixels P disposed in the second display area 12 so that a spot may not be visually recognized on the display panel 110.

However, although the size of the first transistor TR1 of each of the pixels P disposed in the second display area 12 and the dummy pixels DP disposed in the sub-display area 20 according to the embodiments of the present disclosure has been described as being gradually decreased in the direction from the first display area 11 to the peripheral area 30, the configuration of the present disclosure is not limited thereto. For example, according to other embodiments, the size of the first transistor TR1 of each of the pixels P disposed in the second display area 12 may be less than the size of the first transistor TR1 of each of the pixels P disposed in the first display area 11, and greater than the size of the first transistor TR1 of each of the dummy pixels DP disposed in the sub-display area 20, and the first transistors TR1 of the pixels P disposed in the second display area 12 may have the same size. Alternatively, the size of the first transistor TR1 of each of the pixels P disposed in the second display area 12 may be less than the size of the first transistor TR1 of each of the pixels P disposed in the first display area 11, and equal to the size of the first transistor TR1 of each of the dummy pixels DP disposed in the sub-display area 20.

Figure 6:
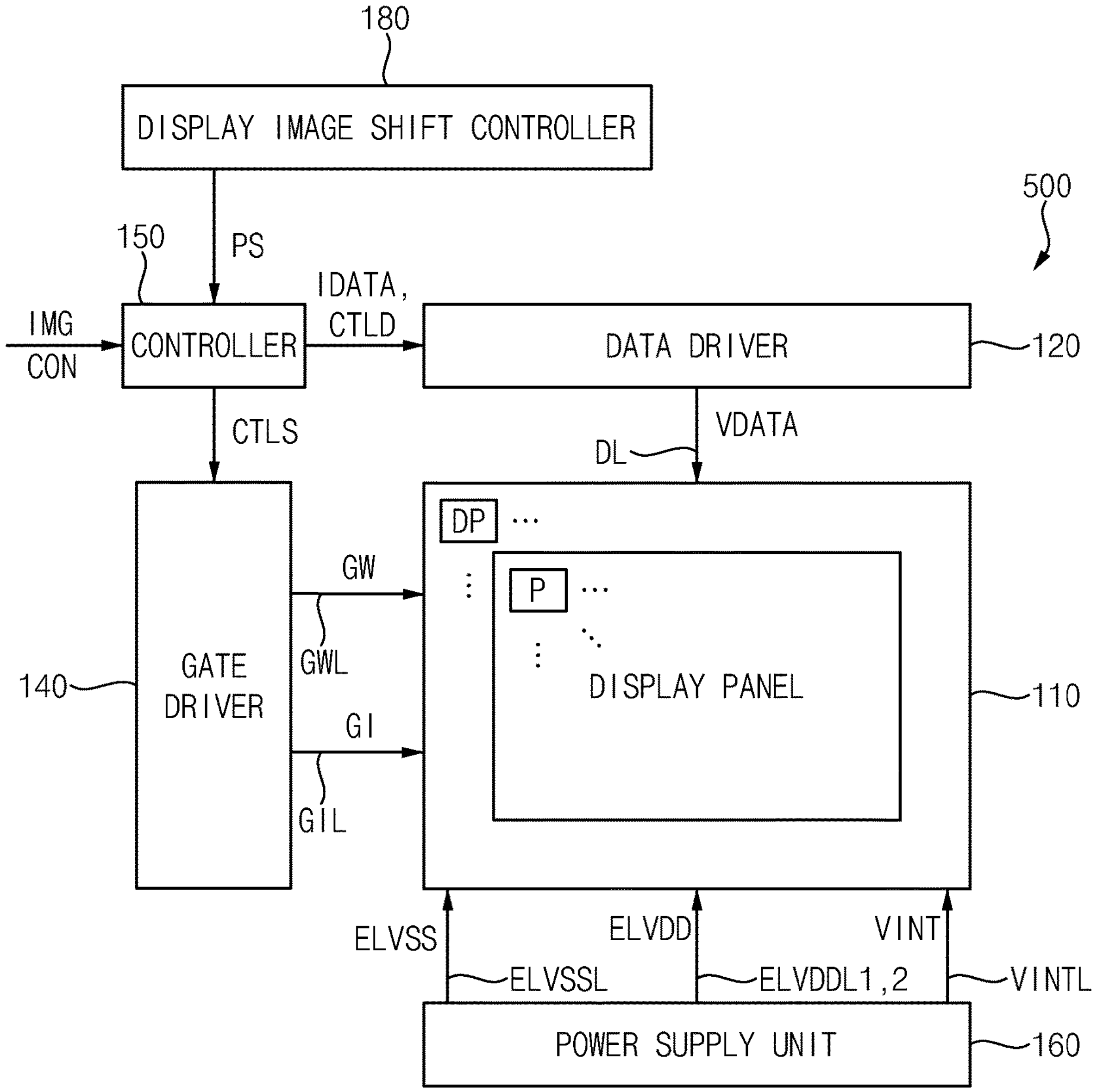
FIG. 6 is a block diagram showing a display device according to embodiments of the present disclosure.

FIG. 6 is a block diagram showing a display device according to embodiments of the present disclosure.

Referring to FIG. 6, a display device 500 may comprise a display panel 110 including a plurality of pixels P and a plurality of dummy pixels DP, a controller 150, a data driver 120, a gate driver 140, a power supply unit 160, a display image shift controller 180, and the like.

The display panel 110 may include a plurality of data lines DL, a plurality of data write gate lines GWL, a plurality of data initialization gate lines GIL, a first power line ELVDDL1, a second power line ELVDDL2, a third power line ELVSSL, an initialization power line VINTL, and a plurality of pixels P and a plurality of dummy pixels DP connected to the lines. In this case, the pixels P may be disposed at a center of the display panel 110, and the dummy pixels DP may be disposed at an outer periphery of the display panel 110 to surround the pixels P.

According to embodiments, each of the pixel P and the dummy pixel DP may include at least two transistors, at least one capacitor, and a light emitting element, and the display panel 110 may be a light emitting display panel.

The controller 150 may receive image data IMG and an input control signal CON from an external host processor. The image data IMG may be RGB image data including red image data, green image data, and blue image data. In addition, the image data IMG may include information on a driving frequency. The control signal CON may include a vertical synchronization signal, a horizontal synchronization signal, an input data enable signal, a master clock signal, and the like, but the embodiments are not limited thereto.

The controller 150 may convert the image data IMG into input image data IDATA by applying an algorithm for correcting image quality to the image data IMG supplied from the external host processor. In some embodiments, when the controller 150 does not include an algorithm for improving image quality, the image data IMG may be converted into the input image data IDATA. That is, the controller 150 may supply the input image data IDATA to the data driver 120.

The controller 150 may generate a data control signal CTLD for controlling an operation of the data driver 120 and a gate control signal CTLS for controlling an operation of the gate driver 140 based on the input control signal CON. For example, the gate control signal CTLS may include a vertical start signal, gate clock signals, and the like, and the data control signal CTLD may include a horizontal start signal, a data clock signal, and the like.

According to the embodiments, when a display image is output from (or displayed on) the display panel 110 for a preset time, the controller 150 may receive a display image shift signal PS from the display image shift controller 180. When the controller 150 receives the display image shift signal PS, the controller 150 may supply the input image data IDATA to which the display image shift signal PS is applied to the data driver 120 so that the display image is entirely shifted.

In addition, the controller 150 may determine a deterioration compensation area in the display panel 110 based on the display image shift signal PS. After the controller 150 determines the deterioration compensation area, the controller 150 may change a path of a current flowing through each of the pixels P and the dummy pixels DP disposed in the deterioration compensation area to allow the pixels P and the dummy pixels DP disposed in the deterioration compensation area to deteriorate so that the pixels P and the dummy pixels DP disposed in the deterioration compensation area may deteriorate. Alternatively, the power supply unit 160 may supply an initialization power VINT without supplying a first power ELVDD to the pixels P and the dummy pixels DP disposed in the deterioration compensation area through the second power line ELVDDL2 connected to the pixels P and the dummy pixels DP disposed in the deterioration compensation area so that the pixels P and the dummy pixels DP disposed in the deterioration compensation area may deteriorate.

The gate driver 140 may generate data write gate signals GW and data initialization gate signals GI based on the gate control signal CTLS received from the controller 150. The gate driver 140 may output the data write gate signals GW and the data initialization gate signals GI to the pixels P and the dummy pixels DP, which are connected to the data write gate lines GWL and the data initialization gate lines GIL, respectively.

The power supply unit 160 may generate a first power ELVDD, a second power ELVSS, and an initialization power VINT, and may provide the first power ELVDD, the second power ELVSS, and the initialization power VINT to the pixels P and the dummy pixels DP through the first power line ELVDDL1, the second power line ELVDDL2, the third power line ELVSSL, and the initialization power line VINTL. According to the embodiments, a voltage level of the first power ELVDD may be different from a voltage level of the second power ELVSS. In addition, the power supply unit 160 may continuously provide the first power ELVDD to the display panel 110 through the first power line ELVDDL1, and may selectively provide the first power ELVDD to the display panel 110 through the second power line ELVDDL2.

The data driver 120 may receive the data control signal CTLD and the input image data IDATA (or the input image data IDATA to which the display image shift signal PS is applied) from the controller 150. In addition, the data driver 120 may receive a gamma reference voltage from a gamma reference voltage generator. The data driver 120 may convert digital input image data IDATA into an analog data voltage by using the gamma reference voltage. In this case, the analog data voltage obtained by the conversion will be defined as a data voltage VDATA. The data driver 120 may output data voltages VDATA to the pixels P and the dummy pixels DP, which are connected to the data lines DL, based on the data control signal CTLD. For example, the data driver 120 may include a shift register, a data sampling latch, a data holding latch, a level shifter, a digital-to-analog converter, a buffer, and the like. According to the embodiments, the display panel 110 may initially output the display image only through the pixels P without outputting the display image through the dummy pixels DP. In this case, the data driver 120 may receive the input image data IDATA from the controller 150. Meanwhile, when the display image is output from (or displayed on) the display panel 110 for the preset time, the data driver 120 may receive the input image data IDATA to which the display image shift signal PS is applied from the controller 150. In this case, the display image may be entirely shifted in the display panel 110, and the display image may be output through some of the dummy pixels DP.

The display image shift controller 180 may generate the display image shift signal PS, and supply the display image shift signal PS to the controller 150. The display image shift signal PS may include information on a path through which the display image is shifted.

Figure 7:
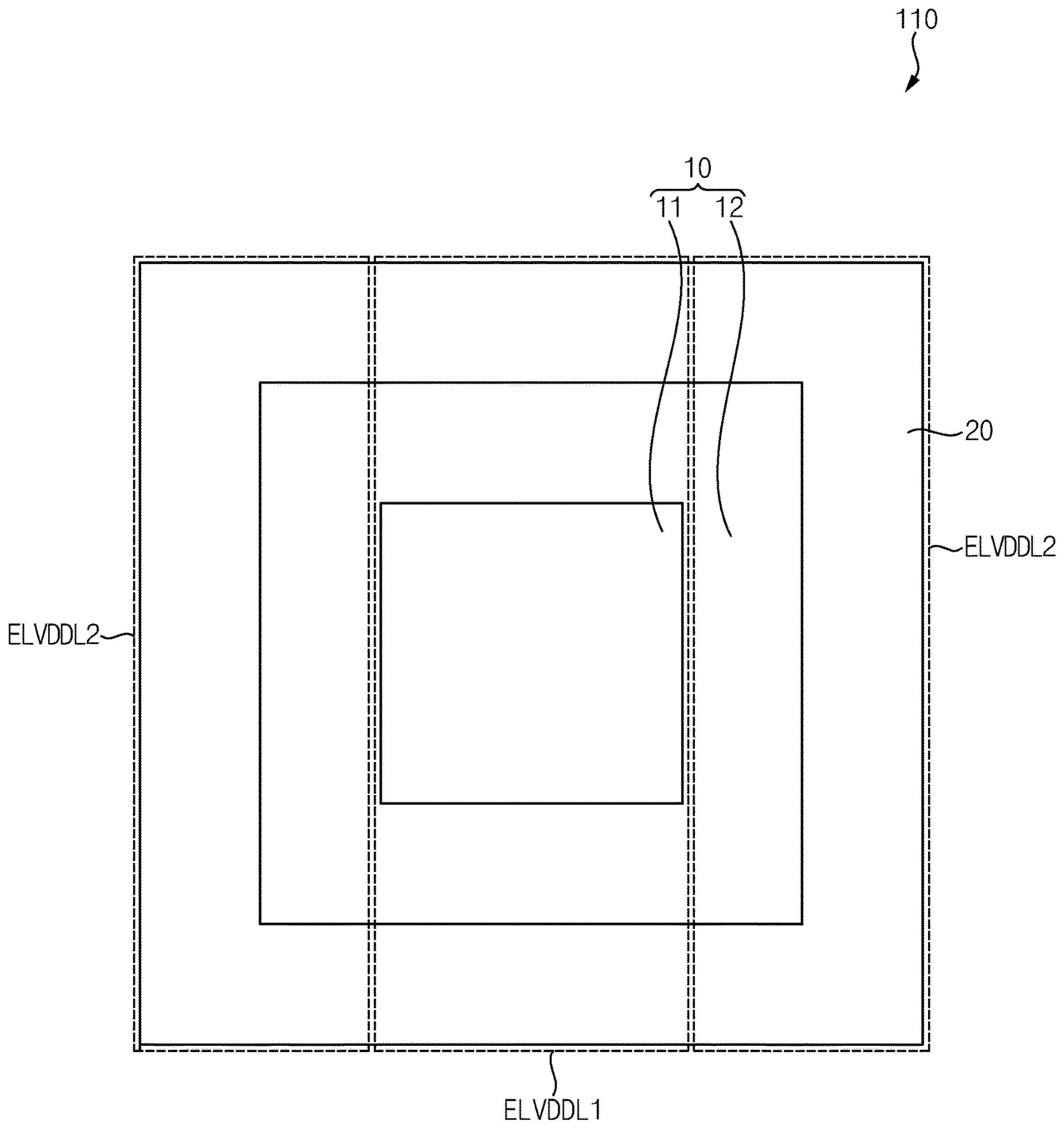
FIG. 7 is a plan view for describing first and second power lines included in the display device of FIG. 6.

FIG. 7 is a plan view for describing first and second power lines included in the display device of FIG. 6.

Referring to FIGS. 2 and 7, the display panel 110 may include a display area 10, a sub-display area 20 surrounding the display area 10, and a peripheral area 30 surrounding the sub-display area 20. In this case, the display area 10 may include a first display area 11 and a second display area 12 surrounding the first display area 11.

The first power ELVDD may be continuously supplied to the first display area 11, an upper end of the first display area 11, and a lower end of the first display area 11. In other words, a plurality of first power lines ELVDDL1 may be disposed in the first display area 11, the upper end of the first display area 11, and the lower end of the first display area 11. In this case, the first power lines ELVDDL1 may be electrically connected to the pixels P disposed in the first display area 11, the pixels P and the dummy pixels DP disposed in the second display area 12 and the sub-display area 20, which correspond to the upper end of the first display area 11, and the pixels P and the dummy pixels DP disposed in the second display area 12 and the sub-display area 20, which correspond to the lower end of the first display area 11. For example, the first power lines ELVDDL1 may extend in a column direction (e.g., a vertical direction) while being spaced apart from each other.

The first power ELVDD may be selectively supplied to left and right sides of the first display area 11. In other words, a plurality of second power lines ELVDDL2 may be disposed on the left and right sides of the first display area 11. In this case, the second power lines ELVDDL2 may be electrically connected to the pixels P and the dummy pixels DP disposed in the second display area 12 and the sub-display area 20, which correspond to the left side of the first display area 11, and the pixels P and the dummy pixels DP disposed in the second display area 12 and the sub-display area 20, which correspond to the right side of the first display area 11. For example, the second power lines ELVDDL2 may extend in the column direction while being spaced apart from each other.

As described above, according to the embodiments, the power supply unit 160 may selectively provide the first power ELVDD to the pixels P and the dummy pixels DP disposed in the second display area 12 and the sub-display area 20, which correspond to the left side of the first display area 11, and the pixels P and the dummy pixels DP disposed in the second display area 12 and the sub-display area 20, which correspond to the right side of the first display area 11. Meanwhile, an area in which the first power lines ELVDDL1 are disposed maybe defined as a first area, an area in which the second power lines ELVDDL2 are disposed maybe defined as a second area, the firstarea may be disposed between of the adjacentsecond areas, and the initialization power line VINTL may be disposed in both the first and second areas.

Figure 8:
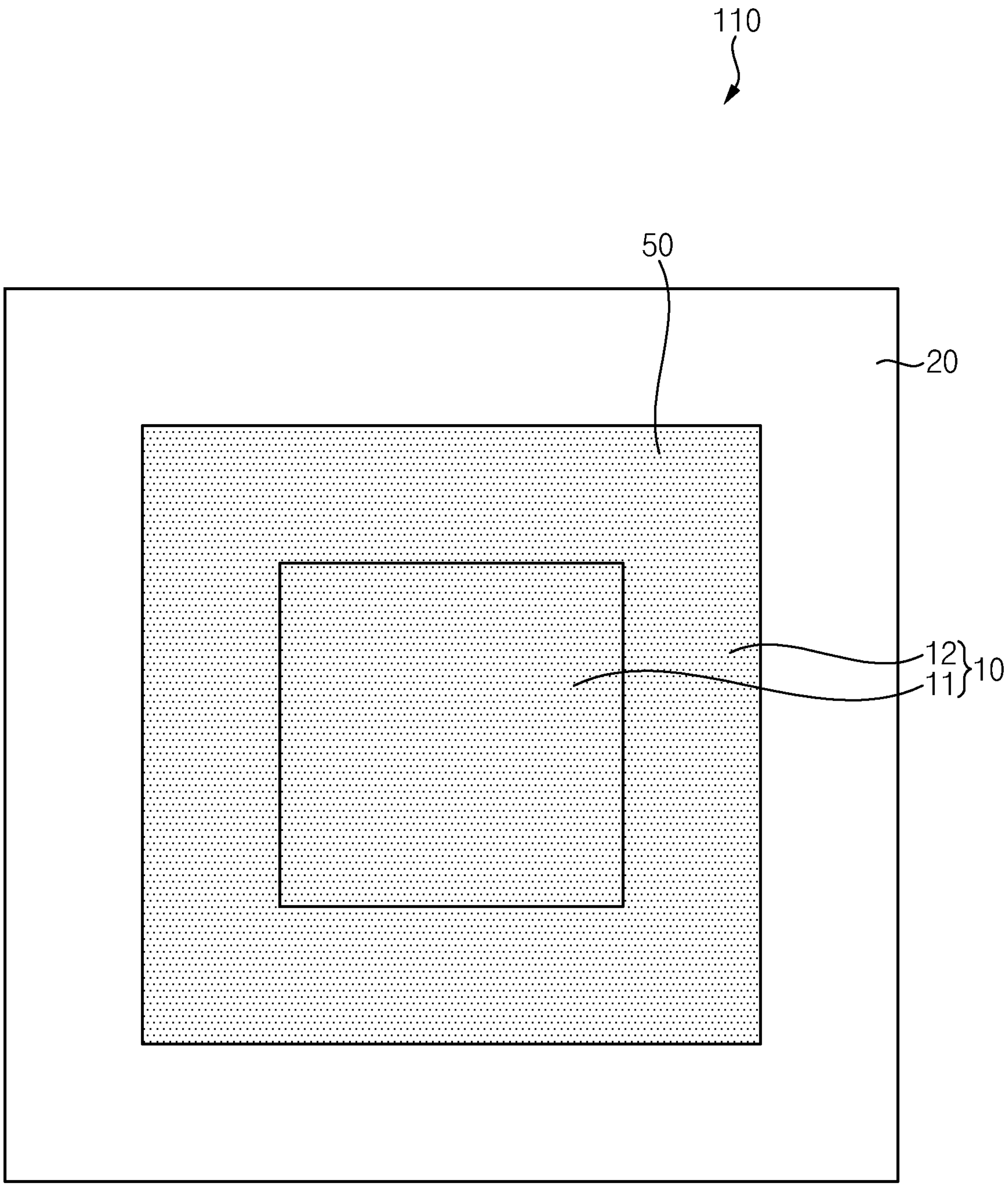
FIG. 8 is a plan view for describing a first shape in which a display image is displayed on a display panel of FIG. 6.
Figure 9:
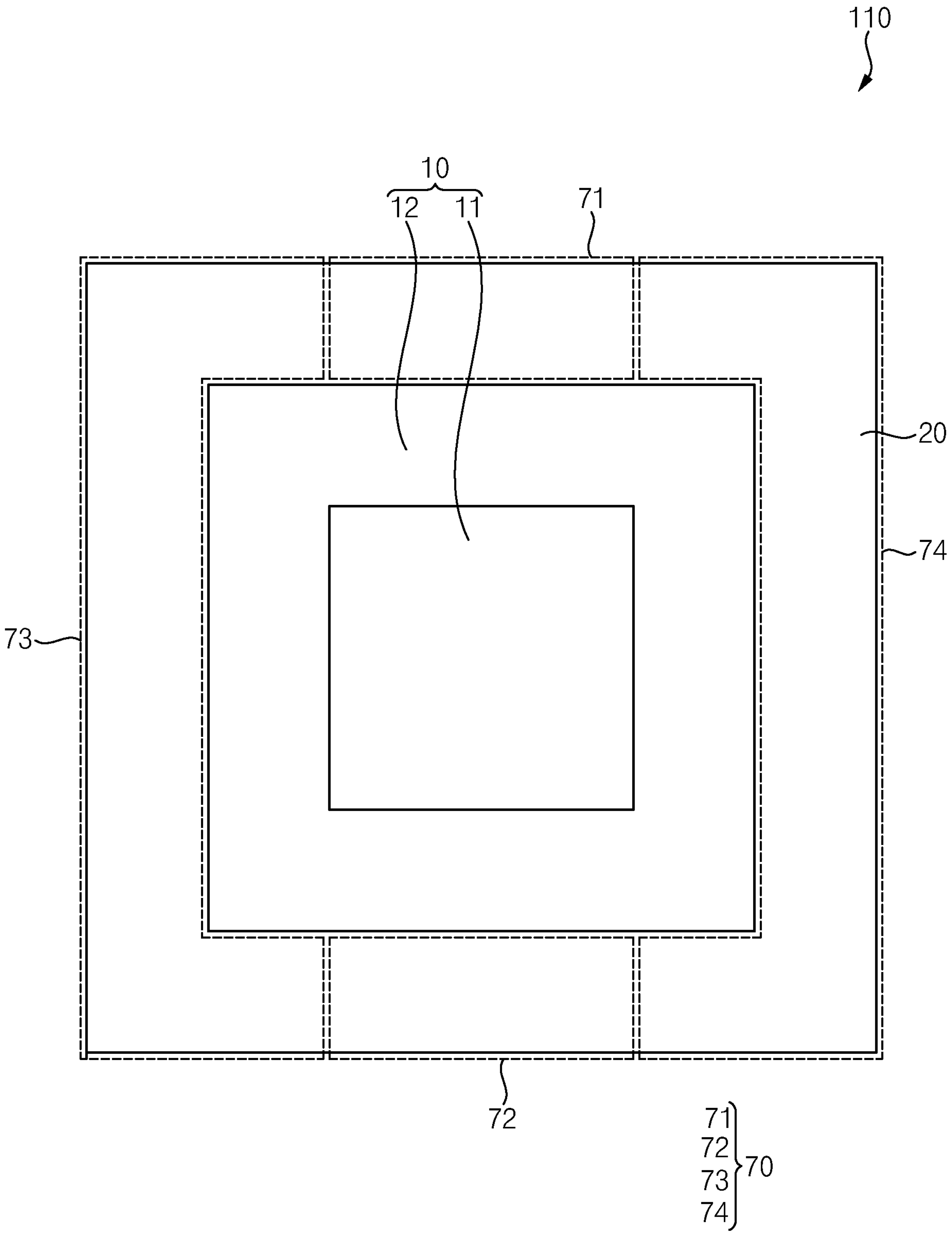
FIG. 9 is a plan view for describing a deterioration compensation area when the display image of FIG. 8 is displayed on the display panel.
Figure 10:
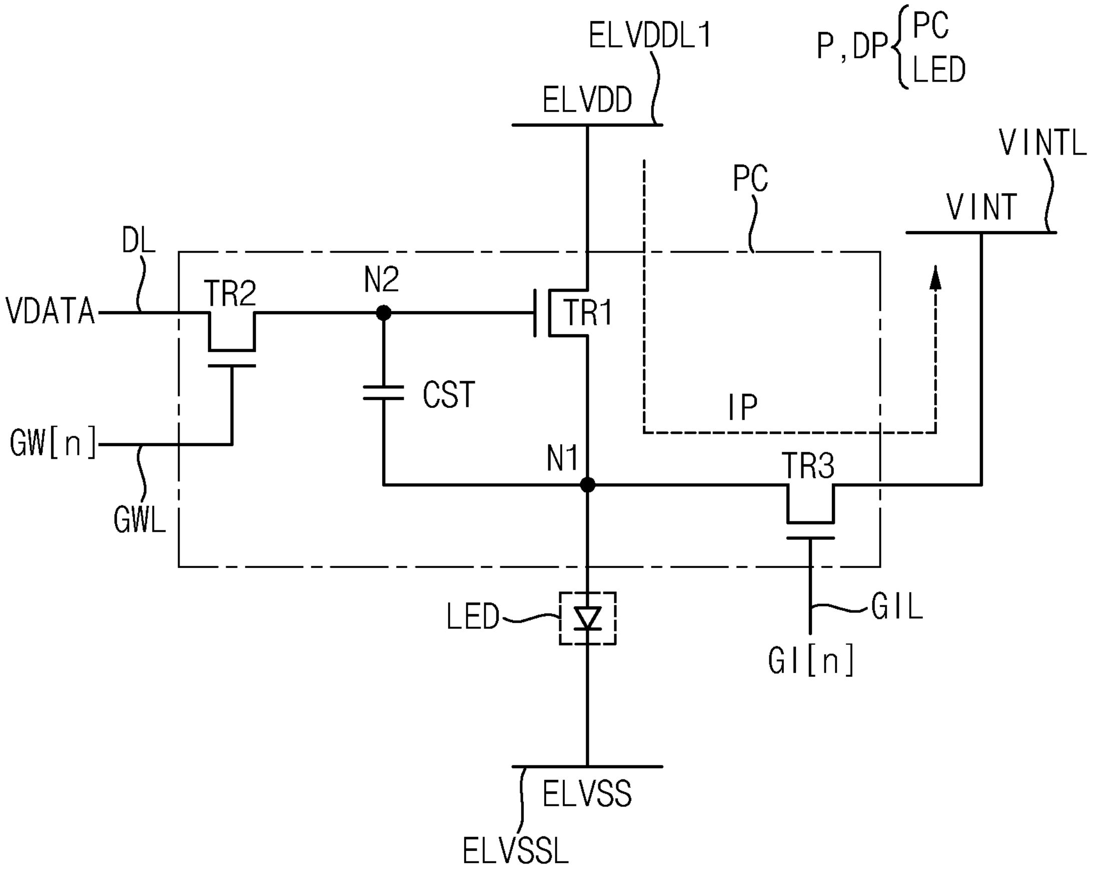
FIGS. 10 and 11 are circuit diagrams for describing a pixel and a dummy pixel included in the display panel of FIG. 8.
Figure 11:
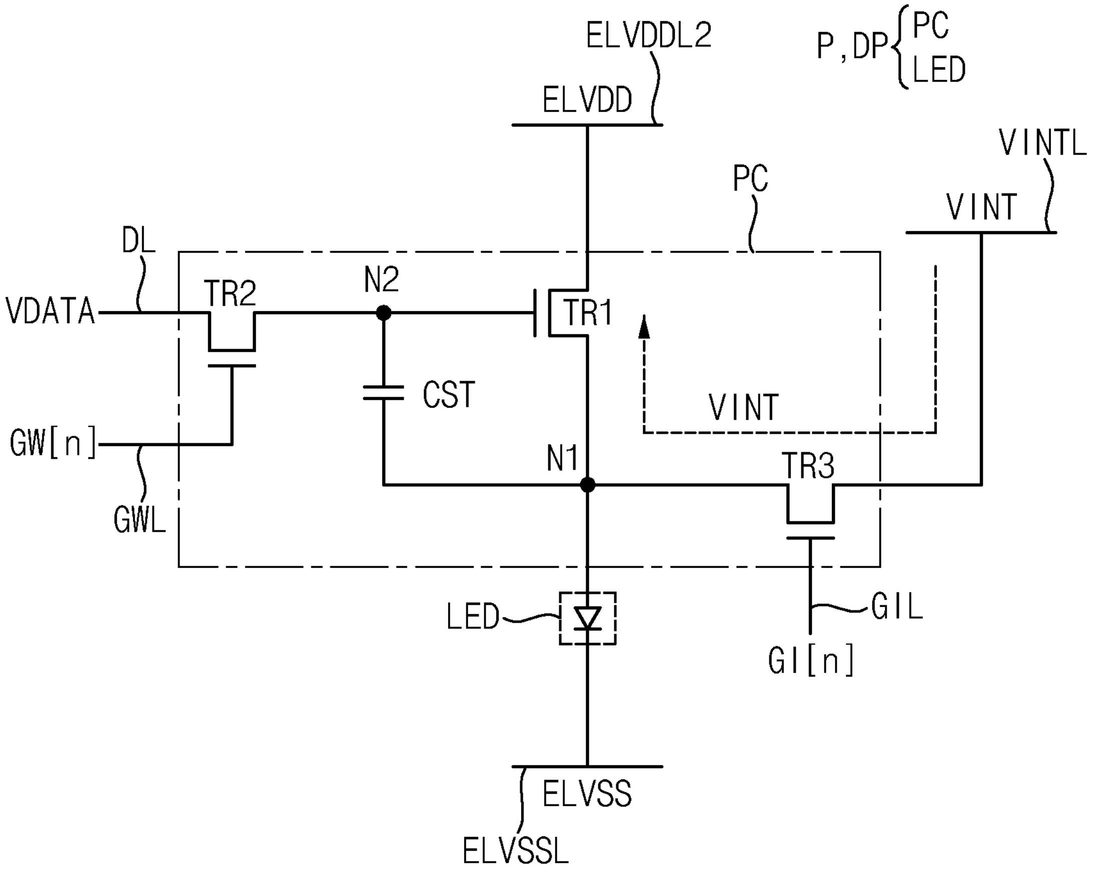

FIG. 8 is a plan view for describing a first shape in which a display image is displayed on a display panel of FIG. 6, FIG. 9 is a plan view for describing a deterioration compensation area when the display image of FIG. 8 is displayed on the display panel, and FIGS. 10 and 11 are circuit diagrams for describing a pixel and a dummy pixel included in the display panel of FIG. 8.

Referring to FIGS. 8 and 9, when the display panel 110 displays the display image 50 only in the display area 10, as shown in FIG. 9, the controller 150 may determine a deterioration compensation area 70. In this case, an area in which the display image 50 is displayed will be defined as a driving area. The deterioration compensation area 70 may correspond to a portion where the display image 50 is not displayed, and the deterioration compensation area 70 may include a first deterioration compensation area 71, a second deterioration compensation area 72, a third deterioration compensation area 73, and a fourth deterioration compensation area 74. In other words, since the display image 50 is always displayed in the first display area 11, the first display area 11 may not be included in the deterioration compensation area 70.

For example, the first deterioration compensation area 71 and the second deterioration compensation area 72 may correspond to areas except for the driving area in anarea where the first power line ELVDDL1 is disposed, which is shown in FIG. 7, the first deterioration compensation area 71 may be located at the upper end of the first display area 11, and the second deterioration compensation area 72 may be located at the lower end of the first display area 11. In addition, the third deterioration compensation area 73 and the fourth deterioration compensation area 74 may correspond to areas except for the driving area in anarea where the second power line ELVDDL2 is disposed, which is shown in FIG. 7, the third deterioration compensation area 73 may be located on the left side of the first display area 11, and the fourth deterioration compensation area 74 may be located on the right side of the first display area 11.

Referring to FIGS. 9 and 10, according to the embodiments, while the display image 50 is displayed by driving the pixels P disposed in the first display area 11 and the second display area 12, a current may flow along a current path IP in each of the dummy pixels DP disposed in the first and second deterioration compensation areas 71 and 72. For example, while the pixels P disposed in the first display area 11 and the second display area 12 are driven, each of the dummy pixels DP disposed in the first and second deterioration compensation areas 71 and 72 may be configured such that a second transistor TR2 and a third transistor TR3 may be turned on, and the data voltage VDATA may be supplied to a gate terminal of a first transistor TR1. In this case, the first transistor TR1 may be turned on, and the current passing through the first transistor TR1 may pass through the third transistor TR3 so as to flow out to the initialization power line VINTL. In other words, the current may flow along the current path IP due to a voltage difference between the first power line ELVDDL1 to which the first power ELVDD is applied and the initialization power line VINTL to which the initialization power VINT is applied, and the first transistor TR1 may deteriorate due to the current. That is, the current may not flow through a light emitting element LED, and the light emitting element LED may not emit a light. According to the embodiments, the controller 150 may supply a voltage corresponding to an average of load voltages (e.g., a voltage corresponding to a driving current or a data voltage) of the pixels P disposed in (or overlapping) the driving area that is adjacent to the first deterioration compensation area 71 (e.g., the pixels P that are adjacent to the first deterioration compensation area 71 among the pixels P disposed in the second display area 12) as the data voltage VDATA provided to the second transistor TR2 of each of the dummy pixels DP disposed in the first deterioration compensation area 71. In this case, the dummy pixels DP disposed in the first deterioration compensation area 71 may deteriorate at a level that is similar to a deterioration level of the pixels P disposed in the driving area that is adjacent to the first deterioration compensation area 71. In addition, the controller 150 may supply a voltage corresponding to an average of load voltages (e.g., a voltage corresponding to a driving current or a data voltage) of the pixels P disposed in the driving area that is adjacent to the second deterioration compensation area 72 (e.g., the pixels P that are adjacent to the second deterioration compensation area 72 among the pixels P disposed in the second display area 12) as the data voltage VDATA provided to the second transistor TR2 of each of the dummy pixels DP disposed in the second deterioration compensation area 72. In this case, the dummy pixels DP disposed in the second deterioration compensation area 72 may deteriorate at a level that is similar to a deterioration level of the pixels P disposed in the driving area that is adjacent to the second deterioration compensation area 72.

Referring to FIGS. 9 and 11, according to the embodiments, while the display image 50 is displayed by driving the pixels P disposed in the first display area 11 and the second display area 12, the initialization power VINT may be provided to each of the dummy pixels DP disposed in the third and fourth deterioration compensation areas 73 and 74. For example, while the pixels P disposed in the first display area 11 and the second display area 12 are driven, each of the dummy pixels DP disposed in the third and fourth deterioration compensation areas 73 and 74 may be configured such that the first power ELVDD may not be applied to the second power line ELVDDL2, a second transistor TR2 and a third transistor TR3 may be turned on, and the data voltage VDATA may be supplied to a gate terminal of a first transistor TR1. In this case, the first transistor TR1 may be turned on, and the initialization power VINT may pass through the third transistor TR3 so as to be provided to the first transistor TR1. In other words, the initialization power VINT may be supplied to the first transistor TR1 so that the first transistor TR1 may deteriorate. That is, a current may not flow through a light emitting element LED, and the light emitting element LED may not emit a light. According to the embodiments, the controller 150 may supply a voltage corresponding to an average of load voltages of the pixels P disposed in the driving area that is adjacent to the third deterioration compensation area 73 (e.g., the pixels P that are adjacent to the third deterioration compensation area 73 among the pixels P disposed in the second display area 12) as the data voltage VDATA provided to the second transistor TR2 of each of the dummy pixels DP disposed in the third deterioration compensation area 73. In this case, the dummy pixels DP disposed in the third deterioration compensation area 73 may deteriorate at a level that is similar to a deterioration level of the pixels P disposed in the driving area that is adjacent to the third deterioration compensation area 73. In addition, the controller 150 may supply a voltage corresponding to an average of load voltages of the pixels P disposed in the driving area that is adjacent to the fourth deterioration compensation area 74 (e.g., the pixels P that are adjacent to the fourth deterioration compensation area 74 among the pixels P disposed in the second display area 12) as the data voltage VDATA provided to the second transistor TR2 of each of the dummy pixels DP disposed in the fourth deterioration compensation area 74. In this case, the dummy pixels DP disposed in the fourth deterioration compensation area 74 may deteriorate at a level that is similar to a deterioration level of the pixels P disposed in the driving area that is adjacent to the fourth deterioration compensation area 74.

Figure 12:
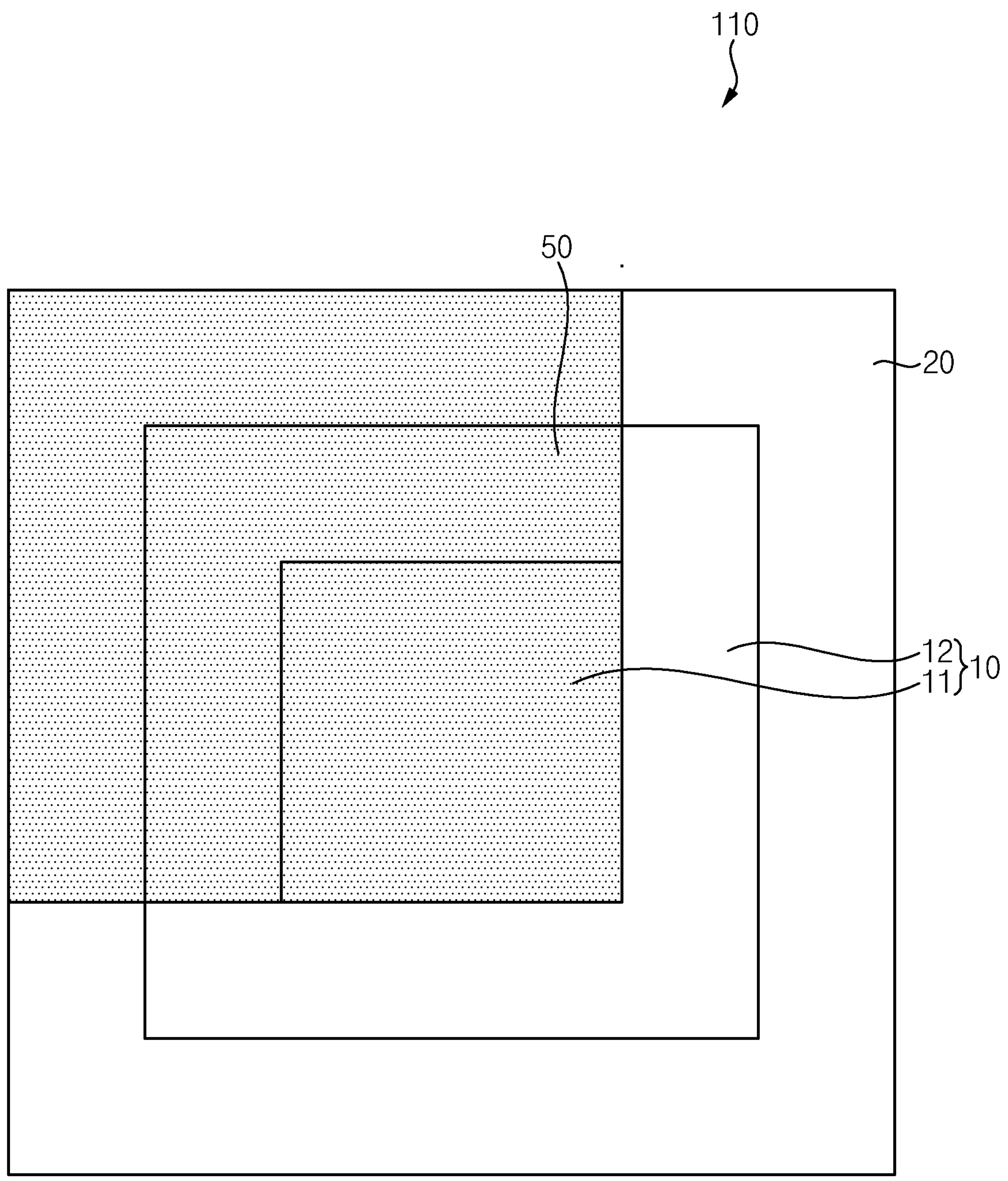
FIG. 12 is a plan view for describing a second shape in which the display image is displayed on the display panel of FIG. 6.
Figure 13:
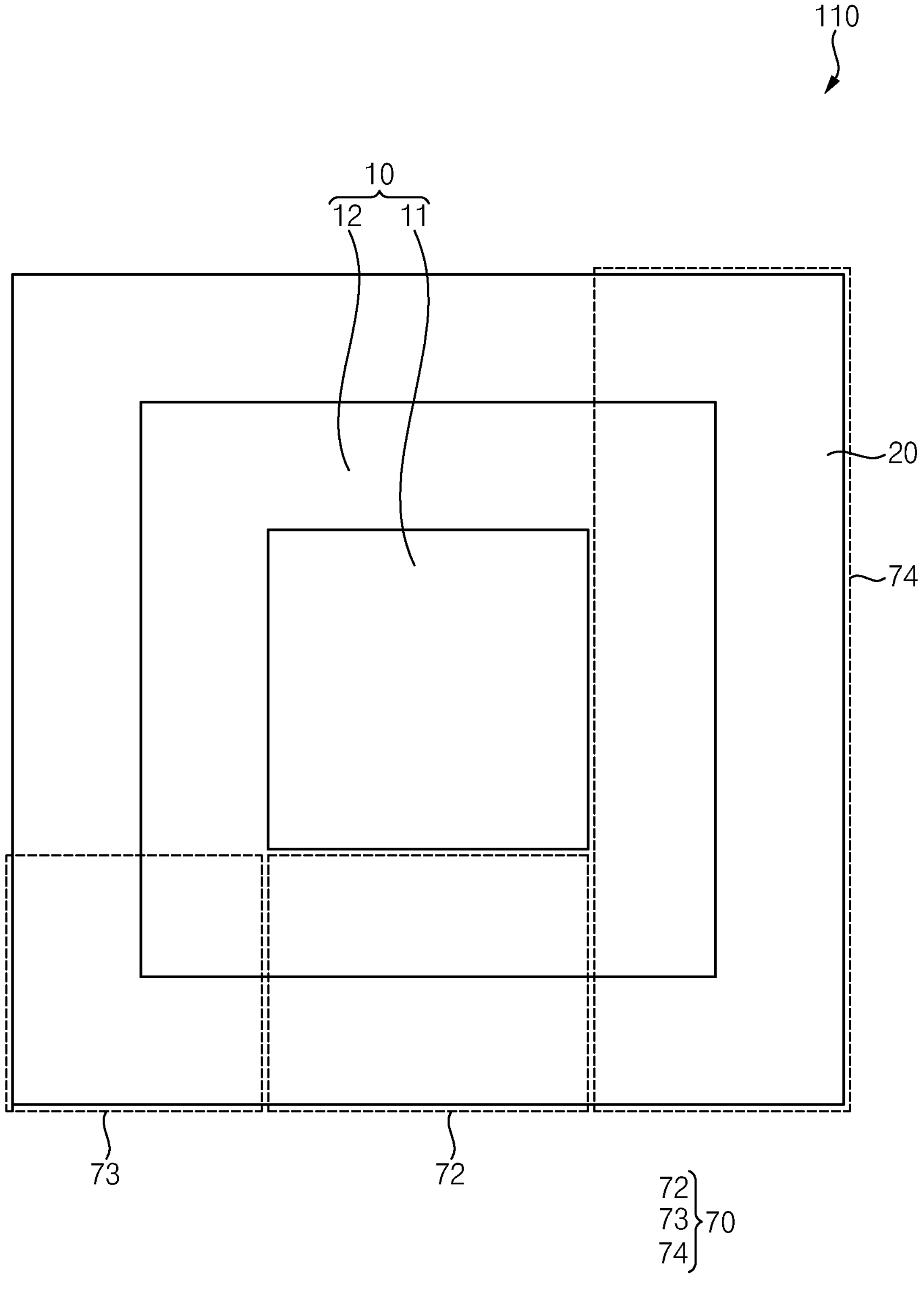
FIG. 13 is a plan view for describing a deterioration compensation area when the display image of FIG. 12 is displayed on the display panel.

FIG. 12 is a plan view for describing a second shape in which the display image is displayed on the display panel of FIG. 6, and FIG. 13 is a plan view for describing a deterioration compensation area when the display image of FIG. 12 is displayed on the display panel.

Referring to FIGS. 12 and 13, when the display image 50 is shifted to an upper left corner on the display panel 110, as shown in FIG. 13, the controller 150 may determine a deterioration compensation area 70. In this case, an area in which the display image 50 is displayed will be defined as a driving area. The deterioration compensation area 70 may correspond to a portion where the display image 50 is not displayed, and the deterioration compensation area 70 may include a second deterioration compensation area 72, a third deterioration compensation area 73, and a fourth deterioration compensation area 74. In other words, since the display image 50 is always displayed in the first display area 11, the first display area 11 may not be included in the deterioration compensation area 70.

For example, the second deterioration compensation area 72 may correspond to an area except the driving area in an area where the first power line ELVDDL1 is disposed, which is shown in FIG. 7, and the second deterioration compensation area 72 may be located at the lower end of the first display area 11. In addition, the third deterioration compensation area 73 and the fourth deterioration compensation area 74 may correspond to areas except for the driving area in an area where the second power line ELVDDL2 is disposed, which is shown in FIG. 7, the third deterioration compensation area 73 may be located at a lower left end of the first display area 11, and the fourth deterioration compensation area 74 may be located on the right side of the first display area 11.

Referring to FIGS. 10 and 13, according to the embodiments, while the display image 50 is displayed by driving the pixels P and the dummy pixels DP disposed in the driving area, a current may flow along a current path IP in each of the pixels P and the dummy pixels DP disposed in the second deterioration compensation area 72. For example, while the pixels P and the dummy pixels DP disposed in the driving area are driven, each of the pixels P and the dummy pixels DP disposed in the second deterioration compensation area 72 may be configured such that a second transistor TR2 and a third transistor TR3 may be turned on, and the data voltage VDATA may be supplied to a gate terminal of a first transistor TR1. In this case, the first transistor TR1 may be turned on, and the current passing through the first transistor TR1 may pass through the third transistor TR3 so as to flow out to the initialization power line VINTL. In other words, the current may flow along the current path IP due to a voltage difference between the first power line ELVDDL1 to which the first power ELVDD is applied and the initialization power line VINTL to which the initialization power VINT is applied, and the first transistor TR1 may deteriorate due to the current. That is, the current may not flow through a light emitting element LED, and the light emitting element LED may not emit a light. According to the embodiments, the controller 150 may supply a voltage corresponding to an average of load voltages of the pixels P disposed in the driving area that is adjacent to the second deterioration compensation area 72 (e.g., the pixels P that are adjacent to the second deterioration compensation area 72 among the pixels P disposed in the first display area 11) as the data voltage VDATA provided to the second transistor TR2 of each of the pixels P and the dummy pixels DP disposed in the second deterioration compensation area 72. In this case, the pixels P and the dummy pixels DP disposed in the second deterioration compensation area 72 may deteriorate at a level that is similar to a deterioration level of the pixels P disposed in the driving area that is adjacent to the second deterioration compensation area 72.

Referring to FIGS. 11 and 13, according to the embodiments, while the display image 50 is displayed by driving the pixels P and the dummy pixels DP disposed in the driving area, the initialization power VINT may be provided to each of the pixels P and the dummy pixels DP disposed in the third and fourth deterioration compensation areas 73 and 74. For example, while the pixels P and the dummy pixels DP disposed in the driving area are driven, each of the pixels P and the dummy pixels DP disposed in the third and fourth deterioration compensation areas 73 and 74 may be configured such that the first power ELVDD may not be applied to the second power line ELVDDL2, a second transistor TR2 and a third transistor TR3 may be turned on, and the data voltage VDATA may be supplied to a gate terminal of a first transistor TR1. In this case, the first transistor TR1 may be turned on, and the initialization power VINT may pass through the third transistor TR3 so as to be provided to the first transistor TR1. In other words, the initialization power VINT may be supplied to the first transistor TR1 so that the first transistor TR1 may deteriorate. That is, a current may not flow through a light emitting element LED, and the light emitting element LED may not emit a light. According to the embodiments, the controller 150 may supply a voltage corresponding to an average of load voltages of the pixels P disposed in the driving area that is adjacent to the third deterioration compensation area 73 (e.g., the pixels P that are adjacent to the third deterioration compensation area 73 among the pixels P disposed in the first display area 11) as the data voltage VDATA provided to the second transistor TR2 of each of the pixels P and the dummy pixels DP disposed in the third deterioration compensation area 73. In this case, the pixels P and the dummy pixels DP disposed in the third deterioration compensation area 73 may deteriorate at a level that is similar to a deterioration level of the pixels P disposed in the driving area that is adjacent to the third deterioration compensation area 73. In addition, the controller 150 may supply a voltage corresponding to an average of load voltages of the pixels P disposed in the driving area that is adjacent to the fourth deterioration compensation area 74 (e.g., the pixels P that are adjacent to the fourth deterioration compensation area 74 among the pixels P disposed in the first display area 11) as the data voltage VDATA provided to the second transistor TR2 of each of the pixels P and the dummy pixels DP disposed in the fourth deterioration compensation area 74. In this case, the pixels P and the dummy pixels DP disposed in the fourth deterioration compensation area 74 may deteriorate at a level that is similar to a deterioration level of the pixels P disposed in the driving area that is adjacent to the fourth deterioration compensation area 74.

Figure 14:
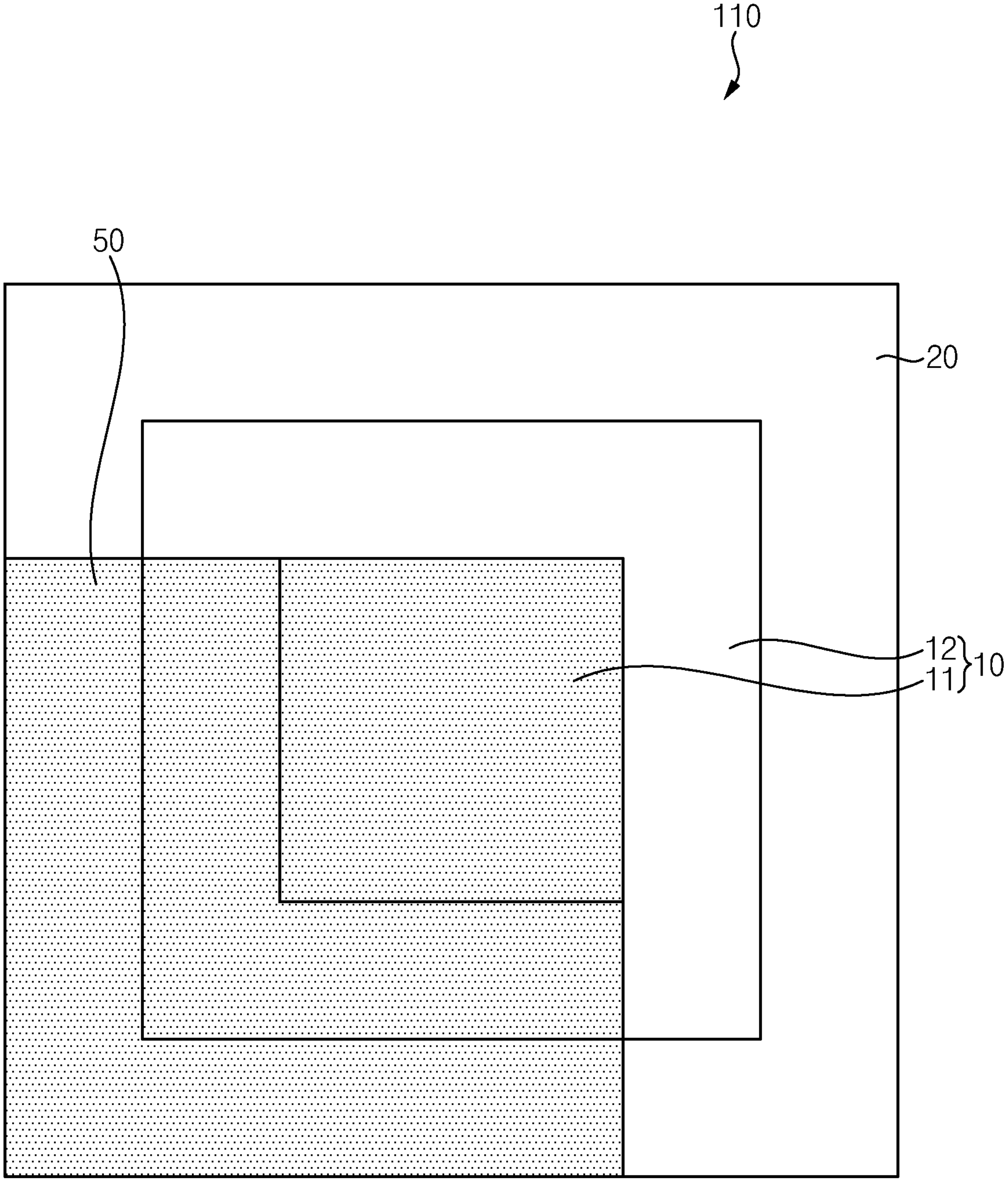
FIG. 14 is a plan view for describing a third shape in which the display image is displayed on the display panel of FIG. 6.
Figure 15:
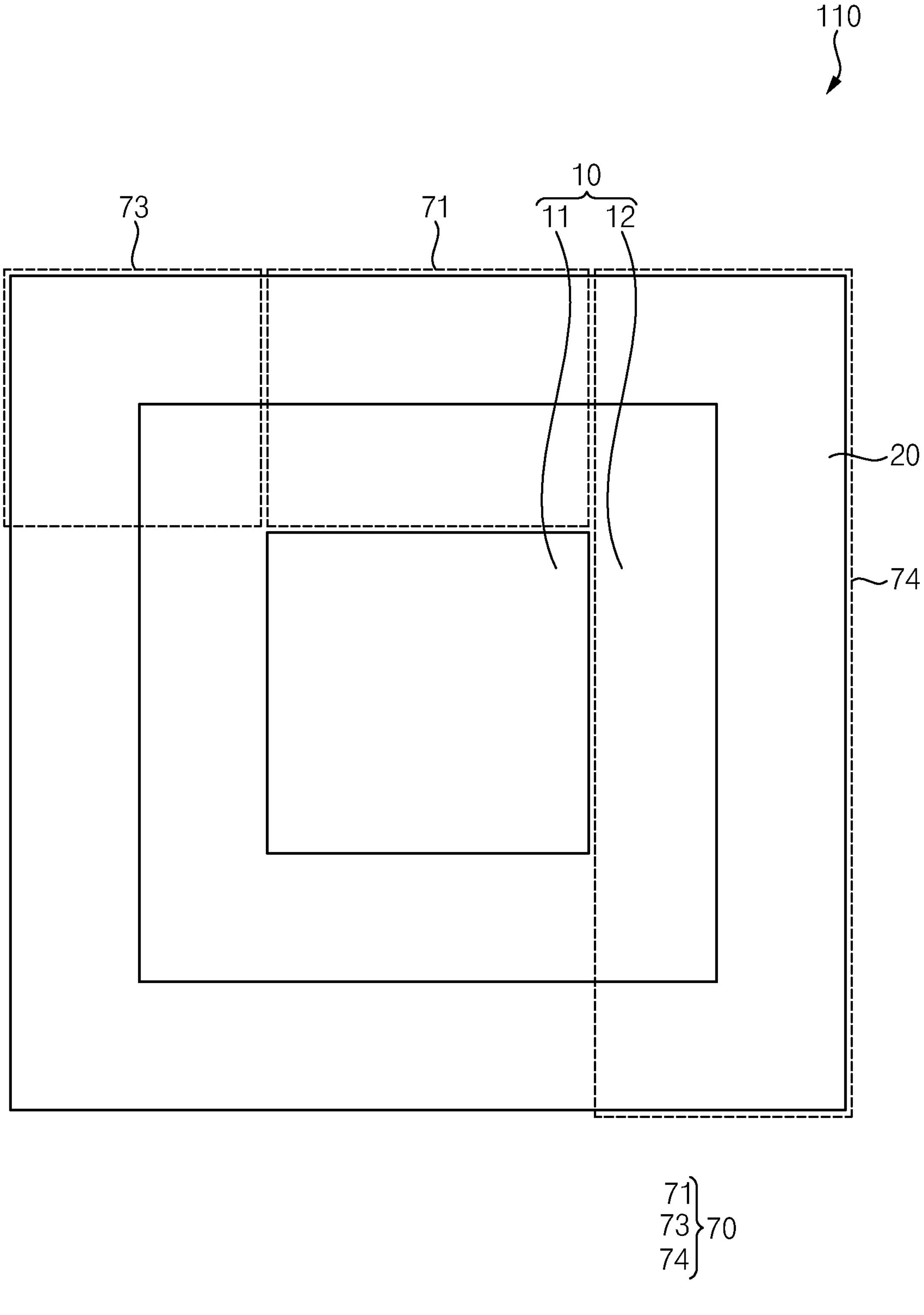
FIG. 15 is a plan view for describing a deterioration compensation area when the display image of FIG. 14 is displayed on the display panel.

FIG. 14 is a plan view for describing a third shape in which the display image is displayed on the display panel of FIG. 6, and FIG. 15 is a plan view for describing a deterioration compensation area when the display image of FIG. 14 is displayed on the display panel.

Referring to FIGS. 14 and 15, when the display image 50 is shifted to a lower left corner on the display panel 110, as shown in FIG. 15, the controller 150 may determine a deterioration compensation area 70. In this case, an area in which the display image 50 is displayed will be defined as a driving area. The deterioration compensation area 70 may correspond to a portion where the display image 50 is not displayed, and the deterioration compensation area 70 may include a first deterioration compensation area 71, a third deterioration compensation area 73, and a fourth deterioration compensation area 74. In other words, since the display image 50 is always displayed in the first display area 11, the first display area 11 may not be included in the deterioration compensation area 70.

For example, the first deterioration compensation area 71 may correspond to an area except the driving area in an area where the first power line ELVDDL1 is disposed, which is shown in FIG. 7, and the first deterioration compensation area 71 may be located at the upper end of the first display area 11. In addition, the third deterioration compensation area 73 and the fourth deterioration compensation area 74 may correspond to areas except for the driving area in an area where the second power line ELVDDL2 is disposed, which is shown in FIG. 7, the third deterioration compensation area 73 may be located at an upper left end of the first display area 11, and the fourth deterioration compensation area 74 may be located on the right side of the first display area 11.

Referring to FIGS. 10 and 15, according to the embodiments, while the display image 50 is displayed by driving the pixels P and the dummy pixels DP disposed in the driving area, a current may flow along a current path IP in each of the pixels P and the dummy pixels DP disposed in the first deterioration compensation area 71. For example, while the pixels P and the dummy pixels DP disposed in the driving area are driven, each of the pixels P and the dummy pixels DP disposed in the first deterioration compensation area 71 may be configured such that a second transistor TR2 and a third transistor TR3 may be turned on, and the data voltage VDATA may be supplied to a gate terminal of a first transistor TR1. In this case, the first transistor TR1 may be turned on, and the current passing through the first transistor TR1 may pass through the third transistor TR3 so as to flow out to the initialization power line VINTL. In other words, the current may flow along the current path IP due to a voltage difference between the first power line ELVDDL1 to which the first power ELVDD is applied and the initialization power line VINTL to which the initialization power VINT is applied, and the first transistor TR1 may deteriorate due to the current. That is, the current may not flow through a light emitting element LED, and the light emitting element LED may not emit a light. According to the embodiments, the controller 150 may supply a voltage corresponding to an average of load voltages of the pixels P disposed in the driving area that is adjacent to the first deterioration compensation area 71 (e.g., the pixels P that are adjacent to the first deterioration compensation area 71 among the pixels P disposed in the first display area 11) as the data voltage VDATA provided to the second transistor TR2 of each of the pixels P and the dummy pixels DP disposed in the first deterioration compensation area 71. In this case, the pixels P and the dummy pixels DP disposed in the first deterioration compensation area 71 may deteriorate at a level that is similar to a deterioration level of the pixels P disposed in the driving area that is adjacent to the first deterioration compensation areas 71.

Referring to FIGS. 11 and 15, according to the embodiments, while the display image 50 is displayed by driving the pixels P and the dummy pixels DP disposed in the driving area, the initialization power VINT may be provided to each of the pixels P and the dummy pixels DP disposed in the third and fourth deterioration compensation areas 73 and 74. For example, while the pixels P and the dummy pixels DP disposed in the driving area are driven, each of the pixels P and the dummy pixels DP disposed in the third and fourth deterioration compensation areas 73 and 74 may be configured such that the first power ELVDD may not be applied to the second power line ELVDDL2, a second transistor TR2 and a third transistor TR3 may be turned on, and the data voltage VDATA may be supplied to a gate terminal of a first transistor TR1. In this case, the first transistor TR1 may be turned on, and the initialization power VINT may pass through the third transistor TR3 so as to be provided to the first transistor TR1. In other words, the initialization power VINT may be supplied to the first transistor TR1 so that the first transistor TR1 may deteriorate. That is, a current may not flow through a light emitting element LED, and the light emitting element LED may not emit a light. According to the embodiments, the controller 150 may supply a voltage corresponding to an average of load voltages of the pixels P disposed in the driving area that is adjacent to the third deterioration compensation area 73 (e.g., the pixels P that are adjacent to the third deterioration compensation area 73 among the pixels P disposed in the first display area 11) as the data voltage VDATA provided to the second transistor TR2 of each of the pixels P and the dummy pixels DP disposed in the third deterioration compensation area 73. In this case, the pixels P and the dummy pixels DP disposed in the third deterioration compensation area 73 may deteriorate at a level that is similar to a deterioration level of the pixels P disposed in the driving area that is adjacent to the third deterioration compensation area 73. In addition, the controller 150 may supply a voltage corresponding to an average of load voltages of the pixels P disposed in the driving area that is adjacent to the fourth deterioration compensation area 74 (e.g., the pixels P that are adjacent to the fourth deterioration compensation area 74 among the pixels P disposed in the first display area 11) as the data voltage VDATA provided to the second transistor TR2 of each of the pixels P and the dummy pixels DP disposed in the fourth deterioration compensation area 74. In this case, the pixels P and the dummy pixels DP disposed in the fourth deterioration compensation area 74 may deteriorate at a level that is similar to a deterioration level of the pixels P disposed in the driving area that is adjacent to the fourth deterioration compensation area 74.

Figure 16:
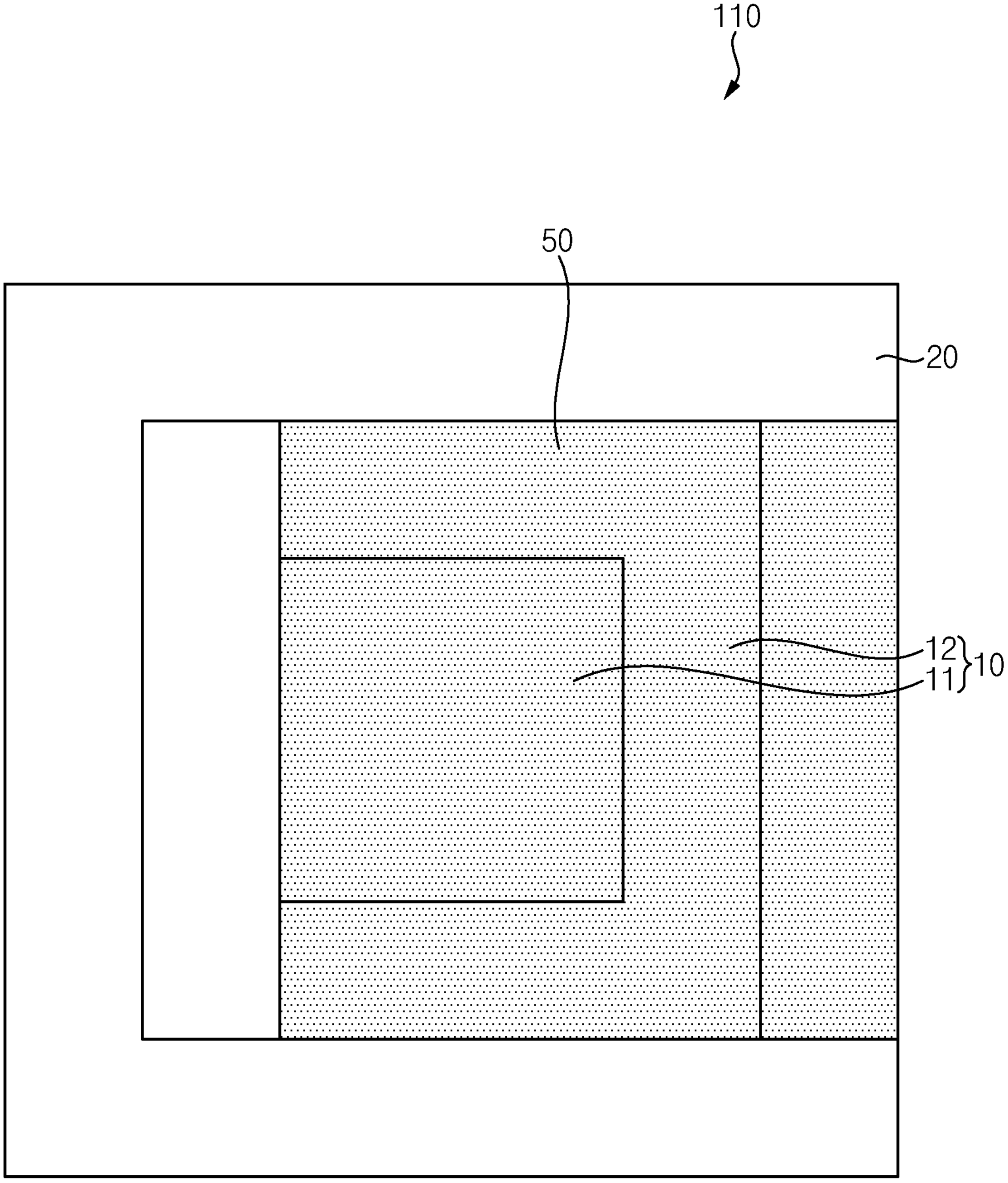
FIG. 16 is a plan view for describing a fourth shape in which the display image is displayed on the display panel of FIG. 6.
Figure 17:
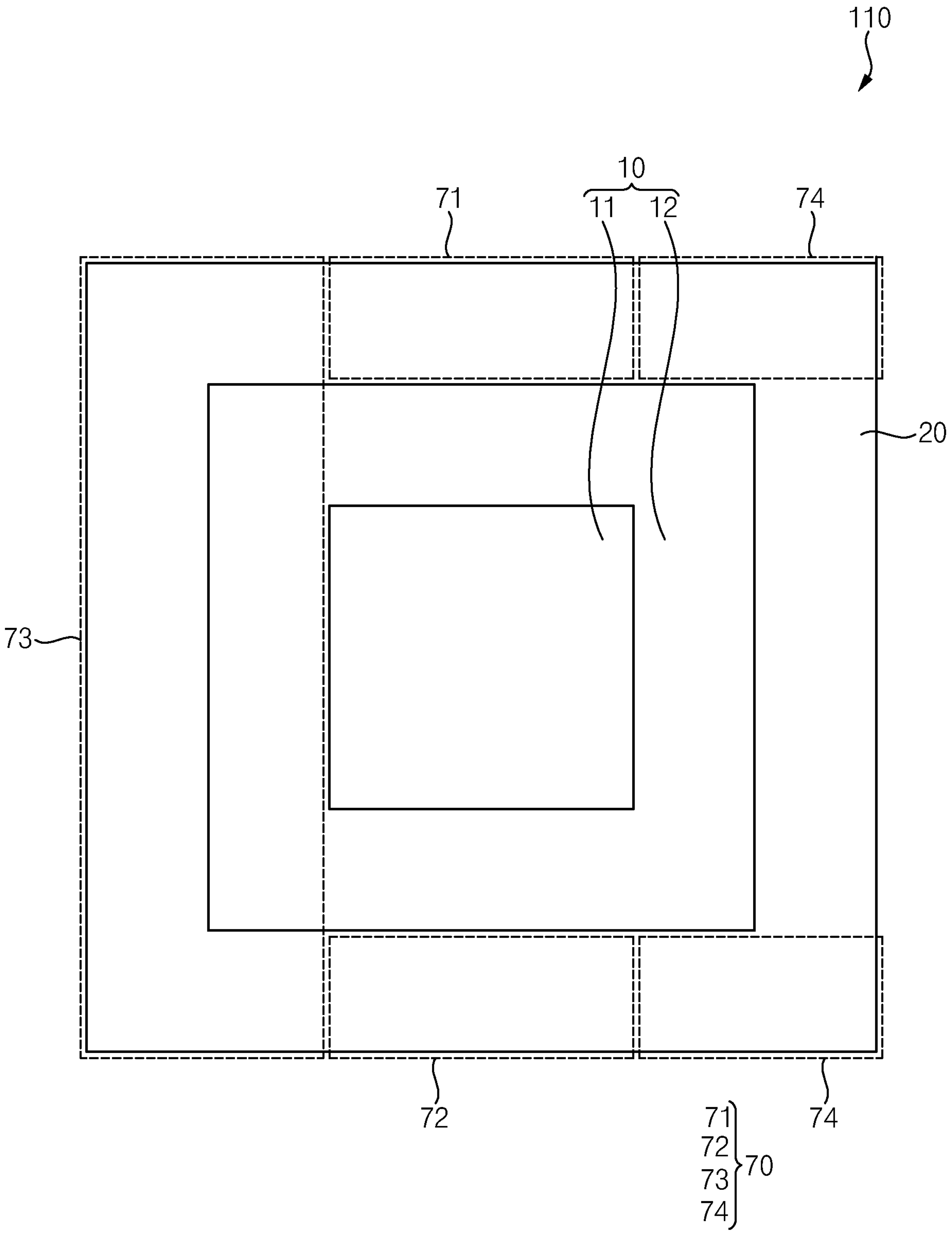
FIG. 17 is a plan view for describing a deterioration compensation area when the display image of FIG. 16 is displayed on the display panel.

FIG. 16 is a plan view for describing a fourth shape in which the display image is displayed on the display panel of FIG. 6, and FIG. 17 is a plan view for describing a deterioration compensation area when the display image of FIG. 16 is displayed on the display panel.

Referring to FIGS. 16 and 17, when the display image 50 is shifted to a right side on the display panel 110, as shown in FIG. 17, the controller 150 may determine a deterioration compensation area 70. In this case, an area in which the display image 50 is displayed will be defined as a driving area. The deterioration compensation area 70 may correspond to a portion where the display image 50 is not displayed, and the deterioration compensation area 70 may include a first deterioration compensation area 71, a second deterioration compensation area 72, a third deterioration compensation area 73, and a fourth deterioration compensation area 74. In other words, since the display image 50 is always displayed in the first display area 11, the first display area 11 may not be included in the deterioration compensation area 70.

For example, the first and second deterioration compensation areas 71 and 72 may correspond to areas except for the driving area in an area where the first power line ELVDDL1 is disposed, which is shown in FIG. 7, the first deterioration compensation area 71 may be located at the upper end of the first display area 11, and the second deterioration compensation area 72 may be located at the lower end of the first display area 11. In addition, the third and fourth deterioration compensation areas 73 and 74 may correspond to areas except for the driving area in an area where the second power line ELVDDL2 is disposed, which is shown in FIG. 7, the third deterioration compensation area 73 may be located on the left side of the first display area 11, and the fourth deterioration compensation area 74 may be located at an upper right end and a lower right end of the first display area 11.

Referring to FIGS. 10 and 17, according to the embodiments, while the display image 50 is displayed by driving the pixels P and the dummy pixels DP disposed in the driving area, a current may flow along a current path IP in each of the dummy pixels DP disposed in the first and second deterioration compensation areas 71 and 72. For example, while the pixels P disposed in the first display area 11 and the second display area 12 are driven, each of the dummy pixels DP disposed in the first and second deterioration compensation areas 71 and 72 may be configured such that a second transistor TR2 and a third transistor TR3 may be turned on, and the data voltage VDATA may be supplied to a gate terminal of a first transistor TR1. In this case, the first transistor TR1 may be turned on, and the current passing through the first transistor TR1 may pass through the third transistor TR3 so as to flow out to the initialization power line VINTL. In other words, the current may flow along the current path IP due to a voltage difference between the first power line ELVDDL1 to which the first power ELVDD is applied and the initialization power line VINTL to which the initialization power VINT is applied, and the first transistor TR1 may deteriorate due to the current. That is, the current may not flow through a light emitting element LED, and the light emitting element LED may not emit a light. According to the embodiments, the controller 150 may supply a voltage corresponding to an average of load voltages of the pixels P disposed in the driving area that is adjacent to the first deterioration compensation area 71 (e.g., the pixels P that are adjacent to the first deterioration compensation area 71 among the pixels P disposed in the second display area 12) as the data voltage VDATA provided to the second transistor TR2 of each of the dummy pixels DP disposed in the first deterioration compensation area 71. In this case, the dummy pixels DP disposed in the first deterioration compensation area 71 may deteriorate at a level that is similar to a deterioration level of the pixels P disposed in the driving area that is adjacent to the first deterioration compensation area 71. In addition, the controller 150 may supply a voltage corresponding to an average of load voltages of the pixels P disposed in the driving area that is adjacent to the second deterioration compensation area 72 (e.g., the pixels P that are adjacent to the second deterioration compensation area 72 among the pixels P disposed in the second display area 12) as the data voltage VDATA provided to the second transistor TR2 of each of the dummy pixels DP disposed in the second deterioration compensation area 72. In this case, the dummy pixels DP disposed in the second deterioration compensation area 72 may deteriorate at a level that is similar to a deterioration level of the pixels P disposed in the driving area that is adjacent to the second deterioration compensation areas 72.

Referring to FIGS. 11 and 17, according to the embodiments, while the display image 50 is displayed by driving the pixels P and the dummy pixels DP disposed in the driving area, the initialization power VINT may be provided to each of the pixels P and the dummy pixels DP disposed in the third and fourth deterioration compensation areas 73 and 74. For example, while the pixels P and the dummy pixels DP disposed in the driving area are driven, each of the pixels P and the dummy pixels DP disposed in the third and fourth deterioration compensation areas 73 and 74 may be configured such that the first power ELVDD may not be applied to the second power line ELVDDL2, a second transistor TR2 and a third transistor TR3 may be turned on, and the data voltage VDATA may be supplied to a gate terminal of a first transistor TR1. In this case, the first transistor TR1 may be turned on, and the initialization power VINT may pass through the third transistor TR3 so as to be provided to the first transistor TR1. In other words, the initialization power VINT may be supplied to the first transistor TR1 so that the first transistor TR1 may deteriorate. That is, a current may not flow through a light emitting element LED, and the light emitting element LED may not emit a light. According to the embodiments, the controller 150 may supply a voltage corresponding to an average of load voltages of the pixels P disposed in the driving area that is adjacent to the third deterioration compensation area 73 (e.g., the pixels P that are adjacent to the third deterioration compensation area 73 among the pixels P disposed in the first display area 11) as the data voltage VDATA provided to the second transistor TR2 of each of the pixels P and the dummy pixels DP disposed in the third deterioration compensation area 73. In this case, the pixels P and the dummy pixels DP disposed in the third deterioration compensation area 73 may deteriorate at a level that is similar to a deterioration level of the pixels P disposed in the driving area that is adjacent to the third deterioration compensation area 73. In addition, the controller 150 may supply a voltage corresponding to an average of load voltages of the pixels P disposed in the driving area that is adjacent to the fourth deterioration compensation area 74 (e.g., the pixels P and the dummy pixels DP that are adjacent to the fourth deterioration compensation area 74 among the pixels P and the dummy pixels DP disposed in the second display area 12 and the sub-display area 20) as the data voltage VDATA provided to the second transistor TR2 of each of the dummy pixels DP disposed in the fourth deterioration compensation area 74. In this case, the dummy pixels DP disposed in the fourth deterioration compensation area 74 may deteriorate at a level that is similar to a deterioration level of the pixels P and the dummy pixels DP disposed in the driving area that is adjacent to the fourth deterioration compensation area 74.

According to the display device 500 of the embodiments of the present disclosure, the deterioration compensation area 70 may be determined, and the pixels P and/or the dummy pixels DP disposed in the deterioration compensation area 70 may be configured such that the current may be provided to the first transistor TR1 along the current path IP or the initialization power VINT may be supplied to the first transistor TR1 without emitting the light through the light emitting element LED so that the pixels P and/or the dummy pixels DP disposed in the deterioration compensation area 70 may deteriorate. Accordingly, a spot may not be visually recognized on the display panel 110.

In addition, the voltage corresponding to the average of the load voltages of the pixels P and/or the dummy pixels DP disposed in the driving area that is adjacent to the deterioration compensation area 70 may be supplied as the data voltage VDATA provided to the second transistor TR2 of each of the pixels P and/or the dummy pixels DP disposed in the deterioration compensation area 70 so that the pixels P and/or the dummy pixels DP disposed in the deterioration compensation area 70 may deteriorate at a level that is similar to a deterioration level of the pixels P and/or the dummy pixels DP disposed in the driving area that is adjacent to the deterioration compensation area 70. Accordingly, a spot may not be visually recognized on the display panel 110 even more.

However, although the display images 50 shifted in three directions have been shown in FIGS. 12, 14, and 16, a shape in which the display image 50 is shifted is not limited thereto. For example, the display image 50 may be gradually shifted in various directions FIG. 18 is a block diagram showing a display device according to embodiments of the present disclosure.

Figure 18:
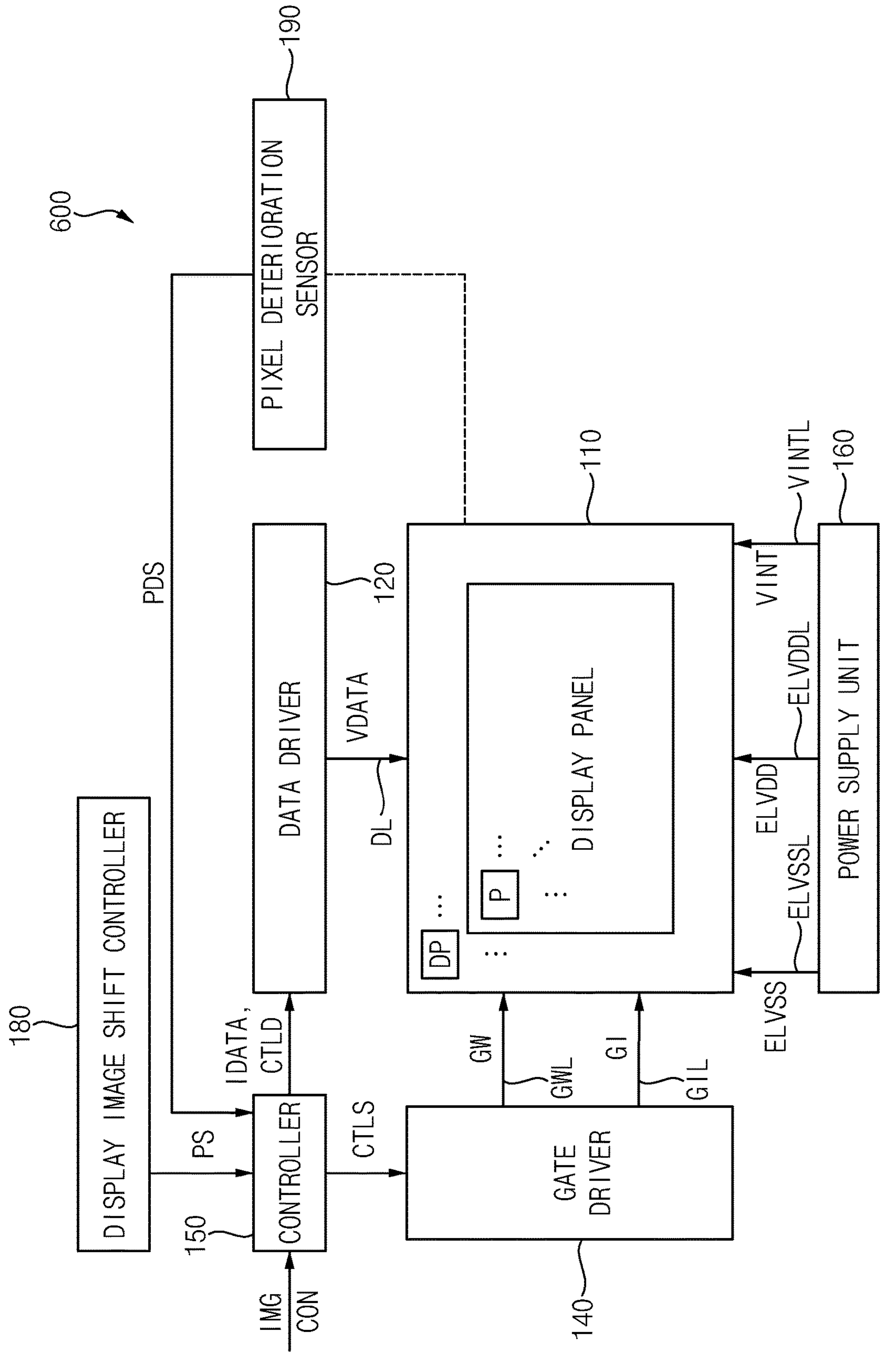
FIG. 18 is a block diagram showing a display device according to embodiments of the present disclosure.

Referring to FIG. 18, a display device 600 may include a display panel 110 including a plurality of pixels P and a plurality of dummy pixels DP, a data driver 120, a gate driver 140, a controller 150, a power supply unit 160, a display image shift controller 180, a pixel deterioration sensor 190, and the like.

The display panel 110 may include a plurality of data lines DL, a plurality of data write gate lines GWL, a plurality of data initialization gate lines GIL, a first power line ELVDDL, a second power line ELVSSL, an initialization power line VINTL, and a plurality of pixels P and a plurality of dummy pixels DP connected to the lines. In this case, the pixels P may be disposed at a center of the display panel 110, and the dummy pixels DP may be disposed at an outer periphery of the display panel 110 to surround the pixels P.

According to embodiments, each of the pixel P and the dummy pixel DP may include at least two transistors, at least one capacitor, and a light emitting element, and the display panel 110 may be a light emitting display panel.

The controller 150 may receive image data IMG and an input control signal CON from an external host processor. The image data IMG may be RGB image data including red image data, green image data, and blue image data. In addition, the image data IMG may include information on a driving frequency. The control signal CON may include a vertical synchronization signal, a horizontal synchronization signal, an input data enable signal, a master clock signal, and the like, but the embodiments are not limited thereto. The controller 150 may supply input image data IDATA to the data driver 120. The controller 150 may generate a data control signal CTLD for controlling an operation of the data driver 120 and a gate control signal CTLS for controlling an operation of the gate driver 140 based on the input control signal CON.

According to the embodiments, when a display image is output from the display panel 110 for a preset time, the controller 150 may receive a display image shift signal PS from the display image shift controller 180. When the controller 150 receives the display image shift signal PS, the controller 150 may supply the input image data IDATA to which the display image shift signal PS is applied to the data driver 120 so that the display image is entirely shifted.

In addition, the controller 150 may determine a deterioration compensation area in the display panel 110 based on the display image shift signal PS. The controller 150 may receive a pixel deterioration signal PDS including information on an average deterioration amount of the pixels P and the dummy pixels DP disposed in a second display area 12 and a sub-display area 20 from the pixel deterioration sensor 190. After the controller 150 determines the deterioration compensation area, the pixels P and the dummy pixels DP disposed in the deterioration compensation area may be driven with decreased luminances based on the average deterioration amount of the pixels P and the dummy pixels DP disposed in the deterioration compensation area.

The gate driver 140 may generate data write gate signals GW and data initialization gate signals GI based on the gate control signal CTLS received from the controller 150. The gate driver 140 may output the data write gate signals GW and the data initialization gate signals GI to the pixels P and the dummy pixels DP, which are connected to the data write gate lines GWL and the data initialization gate lines GIL, respectively.

The power supply unit 160 may generate a first power ELVDD, a second power ELVSS, and an initialization power VINT and may provide the first power ELVDD, the second power ELVSS, and the initialization power VINT to the pixels P and the dummy pixels DP through the first power line ELVDDL, the second power line ELVSSL, and the initialization power line VINTL, respectively. According to the embodiments, a voltage level of the first power ELVDD may be higher than a voltage level of the second power ELVSS.

The data driver 120 may receive the data control signal CTLD and the input image data IDATA (or the input image data IDATA to which the display image shift signal PS is applied) from the controller 150. In addition, the data driver 120 may receive a gamma reference voltage from a gamma reference voltage generator. The data driver 120 may convert digital input image data IDATA into an analog data voltage by using the gamma reference voltage. In this case, the analog data voltage obtained by the conversion maybe defined as a data voltage VDATA. The data driver 120 may output data voltages VDATA to the pixels P and the dummy pixels DP, which are connected to the data lines DL, based on the data control signal CTLD. For example, the data driver 120 may include a shift register, a data sampling latch, a data holding latch, a level shifter, a digital-to-analog converter, a buffer, and the like. According to the embodiments, the display panel 110 may initially output the display image only through the pixels P without outputting the display image through the dummy pixels DP. In this case, the data driver 120 may receive the input image data IDATA from the controller 150. Meanwhile, when the display image is output from the display panel 110 for the preset time, the data driver 120 may receive the input image data IDATA to which the display image shift signal PS is applied from the controller 150. In this case, the display image may be entirely shifted in the display panel 110, and the display image may be output through some of the dummy pixels DP.

The display image shift controller 180 may generate the display image shift signal PS, and supply the display image shift signal PS to the controller 150. The display image shift signal PS may include information on a path through which the display image is shifted.

The pixel deterioration sensor 190 may measure deterioration amounts of the pixels P and the dummy pixels DP disposed in the second display area 12 and the sub-display area 20. The pixel deterioration sensor 190 may generate the pixel deterioration signal PDS based on the deterioration amounts of the pixels P and the dummy pixels DP disposed in the second display area 12 and the sub-display area 20, and may supply the pixel deterioration signal PDS to the controller 150. In other words, the pixel deterioration signal PDS may include information on an average deterioration amount of the pixels P and the dummy pixels DP disposed in the second display area 12 and the sub-display area 20. In some embodiments, the pixel deterioration sensor 190 and the data driver 120 (or the controller 150 and the power supply unit 160) may be implemented as a single integrated circuit.

According to a conventional display device, due to a deterioration deviation of pixels disposed in a first display area with respect to pixels disposed in a second display area and dummy pixels disposed in a sub-display area, a spot may be visually recognized in the second display area and the sub-display area. For example, the pixels disposed in the second display area and the dummy pixels disposed in the sub-display area may deteriorate relatively less, so that the second display area and the sub-display area may be visually recognized to be brighter than the first display area.

According to the embodiments of the present disclosure, the display device 600 may include the pixel deterioration sensor 190 configured to generate the pixel deterioration signal PDS including the information on the average deterioration amount of the pixels P and the dummy pixels DP disposed in the second display area 12 and the sub-display area 20 so that the pixels P and the dummy pixels DP disposed in the deterioration compensation area may be driven with the decreased luminances based on the average deterioration amount of the pixels P and the dummy pixels DP disposed in the deterioration compensation area. Accordingly, a spot may not be visually recognized on the display panel 110.

Figure 19:
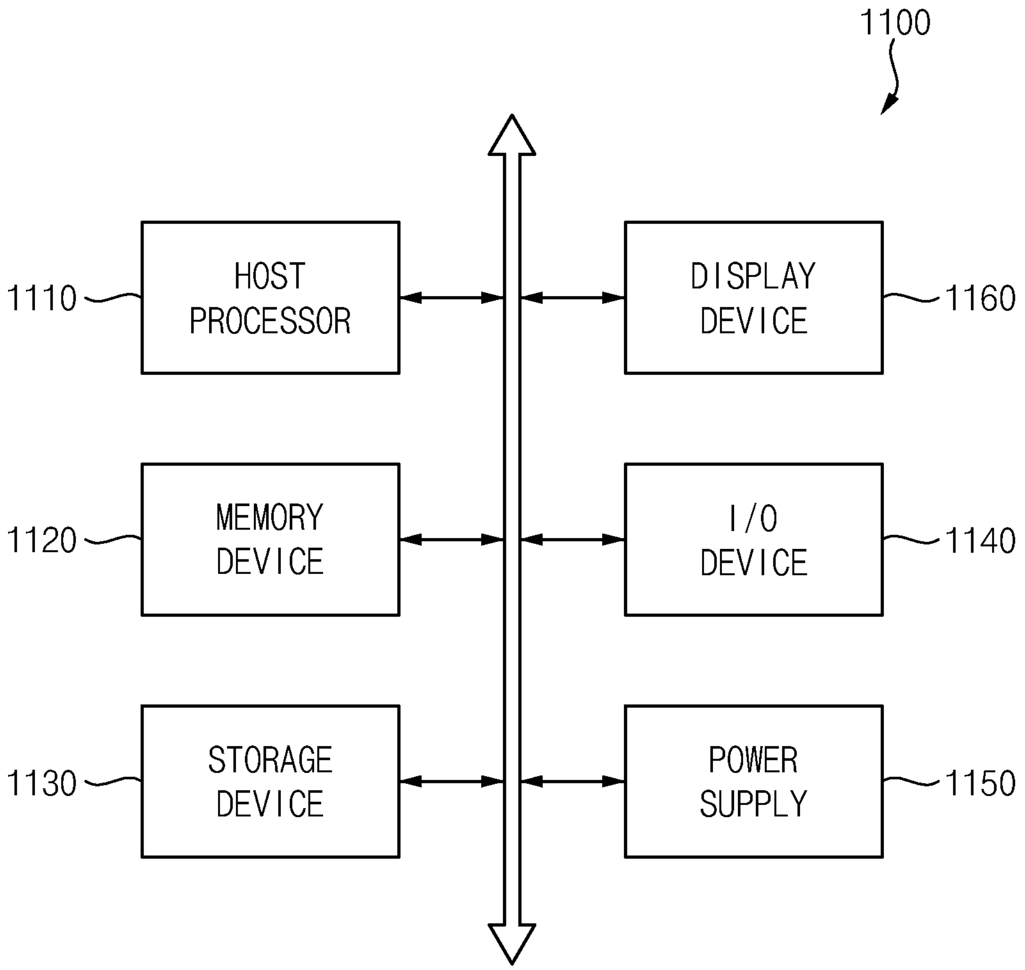
FIG. 19 is a block diagram illustrating an electronic device including a display device according to the present disclosure.

FIG. 19 is a block diagram illustrating an electronic device including a display device according to the present disclosure.

Referring to FIG. 19, an electronic device 1100 may include a processor 1110, a memory device 1120, a storage device 1130, an input/output (I/O) device 1140, a power supply 1150, and a display device 1160. The electronic device 1100 may further include a plurality of ports for communicating with a video card, a sound card, a memory card, a universal serial bus (USB) device, other electric devices, etc.

The processor 1110 may perform various computing functions or tasks. The processor 1110 may be an application processor (AP), a micro processor, a central processing unit (CPU), etc. The processor 1110 may be coupled to other components via an address bus, a control bus, a data bus, etc. Further, in embodiments, the processor 1110 may be further coupled to an extended bus such as a peripheral component interconnection (PCI) bus.

The memory device 1120 may store data for operations of the electronic device 1100. For example, the memory device 1120 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc, and/or at least one volatile memory device such as a dynamic random access memory (DRAM) device, a static random access memory (SRAM) device, a mobile dynamic random access memory (mobile DRAM) device, etc.

The storage device 1130 may be a solid state drive (SSD) device, a hard disk drive (HDD) device, a CD-ROM device, etc. The I/O device 1140 may be an input device such as a keyboard, a keypad, a mouse, a touch screen, etc, and an output device such as a printer, a speaker, etc. The power supply 1150 may supply power for operations of the electronic device 1100. The display device 1160 may be coupled to other components through the buses or other communication links.

The display device 1160 may include a display panel including a plurality of pixels and a plurality of dummy pixels, a controller, a data driver, a gate driver, a power supply unit, a display image shift controller, and the like. In embodiments, the display device 1160 may constitute the display panel such that a size of the first transistor of each of the pixels disposed in the second display area and the dummy pixels disposed in the sub-display area may be gradually decreased in the direction from the first display area to the peripheral area. For example, when the first transistor is manufactured with a relatively small size, stress caused by the driving current may be relatively increased, and a variation of a threshold voltage may be increased, so that the first transistor manufactured with the relatively small size may deteriorate relatively rapidly. In addition, the first transistor of each of the dummy pixels disposed in the sub-display area, which has a relatively slow deterioration rate, may be manufactured with a relatively smaller size. Accordingly, each of the pixels disposed in the second display area and the dummy pixels disposed in the sub-display area may deteriorate relatively rapidly as compared with deterioration of the pixels disposed in the first display area, and the dummy pixels disposed in the sub-display area may deteriorate relatively rapidly as compared with deterioration of the pixels disposed in the second display area, so that a spot may not be visually recognized on the display panel.

In addition, the display device 1160 may determine the deterioration compensation area, and the pixels and/or the dummy pixels disposed in the deterioration compensation area may be configured such that the current may be provided to the first transistor along the current path or the initialization power may be supplied to the first transistor without emitting the light through the light emitting element, so that the pixels and/or the dummy pixels disposed in the deterioration compensation area may deteriorate. Accordingly, a spot may not be visually recognized on the display panel.

According to embodiments, the electronic device 1100 may be any electronic device including the display device 1160 such as a smart phone, a wearable electronic device, a tablet computer, a mobile phone, a television (TV), a digital TV, a 3D TV, a personal computer, a home appliance, a laptop computer, a personal digital assistant, a portable multimedia player, a digital camera, a music player, a portable game console, a navigation device, or the like.

The present disclosure may be applied to various electronic devices including a display device. For example, the present disclosure may be applied to numerous electronic devices such as vehicle-display devices, ship-display devices, aircraft-display devices, portable communication devices, exhibition display devices, information transfer display devices, medical-display devices, etc.

The foregoing is illustrative of embodiments and is not to be construed as limiting thereof. Although a few embodiments have been described, those skilled in the art will readily appreciate that many modifications are possible in the embodiments without materially departing from the novel teachings and advantages of the present disclosure. Accordingly, all such modifications are intended to be included within the scope of the present disclosureas defined in the claims. Therefore, it is to be understood that the foregoing is illustrative of various embodiments and is not to be construed as limited to the specific embodiments disclosed, and that modifications to the disclosed embodiments, as well as other embodiments, are intended to be included within the scope of the appended claims.

What is claimed is:

1. A display device comprising:

a display panel configured to display a display image and including a display area in which pixels are disposed, and a sub-display area surrounding the display area and in which dummy pixels are disposed;

an image shift controller configured to generate a display image shift signal including information on a path through which the display image is shifted; and a controller configured to receive the display image shift signal to generate input image data to which the display image shift signal is applied, wherein the display area includes a first display area which covers a center of the display panel and a second display area surrounding the first display area, wherein a whole of the first display area and a whole of the second display area output the display image during a predetermined initial time, and the sub-display area does not output the display image during the predetermined initial time, wherein the whole of the first display area always outputs the display image while the display image is displayed, and the whole or a part of the second display area selectively outputs the display image during a second time in which the display image is shifted, wherein a size of a driving transistor included in each of the pixels disposed in the display area is different from a size of a driving transistor included in each of the dummy pixels disposed in the sub-display area, wherein a size of a gate electrode of the driving transistor disposed in the second display area is greater than a size of a gate electrode of the driving transistor included disposed in the sub-display area, and a size of a gate electrode of the driving transistor disposed in the first display area is greater than the size of the gate electrode of the driving transistor disposed in the second display area, wherein an active pattern of each driving transistor disposed in the first display area and the driving transistor disposed in the sub-display area includes a first bend, a second bend, a third bend, and a fourth bend, and wherein lengths of the active pattern between the first bend and the second bend, and between the third bend and the fourth bend of the driving transistor in the first display area are longer than lengths of the active pattern between the first bend and the second bend, and between the third bend and the fourth bend of the driving transistor in the sub-display area.

2. The display device of claim 1, wherein the driving transistor included in each of the pixels disposed in the display area is defined as a first driving transistor, and the first driving transistor includes a first active pattern and a first gate electrode, the driving transistor included in each of the dummy pixels disposed in the sub-display area is defined as a second driving transistor, and the second driving transistor includes a second active pattern and a second gate electrode, and a size of the first driving transistor is greater than a size of the second driving transistor.

3. The display device of claim 1, wherein each of sizes of the driving transistor included in each of the pixels disposed in the second display area and the driving transistor included in each of the dummy pixels disposed in the sub-display area is gradually decreased in a direction from the first display area to the sub-display area.

4. The display device of claim 3, wherein each of the driving transistors included in the pixels disposed in the first display area has a same size.

5. The display device of claim 3, wherein the display image is output through the first display area and the second display area, or output through the first display area, at least a part of the second display area, and at least a part of the sub-display area.

6. The display device of claim 1, wherein the size of the driving transistor included in each of the dummy pixels is gradually decreased as a distance between each of the dummy pixels and the display area is increased.

7. The display device of claim 1, wherein the pixels and the dummy pixels are arranged in a matrix shape.

8. An electronic device comprising:

a host processor;

a display panel configured to display a display image and including a display area in which pixels are disposed, and a sub-display area surrounding the display area and in which dummy pixels are disposed;

an image shift controller configured to generate a display image shift signal including information on a path through which the display image is shifted; and a controller configured to receive an input control signal from the host processor and the display image shift signal from the image shift controller to generate input image data to which the display image shift signal is applied, wherein the display area includes a first display area which covers a center of the display panel and a second display area surrounding the first display area, wherein a whole of the first display area and a whole of the second display area output the display image during a predetermined initial time, and the sub-display area does not output the display image during the predetermined initial time, wherein the whole of the first display area always outputs the display image while the display image is displayed, and the whole or a part of the second display area selectively outputs the display image during a second time in which the display image is shifted, wherein a size of a gate electrode of the driving transistor disposed in the second display area is greater than a size of a gate electrode of the driving transistor disposed in the sub-display area, and a size of a gate electrode of the driving transistor disposed in the first display area is greater than the size of the gate electrode of the driving transistor disposed in the second display area, wherein an active pattern of each driving transistor disposed in the first display area and the driving transistor disposed in the sub-display area includes a first bend, a second bend, a third bend, and a fourth bend, and wherein lengths of the active pattern between the first bend and the second bend, and between the third bend and the fourth bend of the driving transistor in the first display area are longer than lengths of the active pattern between the first bend and the second bend, and between the third bend and the fourth bend of the driving transistor in the sub-display area.

* * * * *